(12) United States Patent
Johta et al.

(10) Patent No.: US 9,623,895 B2
(45) Date of Patent: Apr. 18, 2017

(54) STEERING DEVICE

(71) Applicant: NSK LTD., Tokyo (JP)

(72) Inventors: Masaya Johta, Gunma (JP); Daiki Orihara, Gunma (JP); Ryoichi Suzuki, Gunma (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 14/782,351

(22) PCT Filed: Feb. 27, 2015

(86) PCT No.: PCT/JP2015/055881
§ 371 (c)(1),
(2) Date: Oct. 5, 2015

(87) PCT Pub. No.: WO2015/156055
PCT Pub. Date: Oct. 15, 2015

(65) Prior Publication Data
US 2017/0015346 A1   Jan. 19, 2017

(30) Foreign Application Priority Data

Apr. 11, 2014   (JP) ................. 2014-082178
Jun. 5, 2014    (JP) ................. 2014-116433

(51) Int. Cl.
*B62D 1/19*    (2006.01)
*B62D 1/187*   (2006.01)
*B62D 1/184*   (2006.01)

(52) U.S. Cl.
CPC ............ *B62D 1/195* (2013.01); *B62D 1/184* (2013.01); *B62D 1/187* (2013.01); *B62D 1/192* (2013.01)

(58) Field of Classification Search
CPC ........ B62D 1/195; B62D 1/192; B62D 1/184; B62D 1/187; B62D 1/19
See application file for complete search history.

(56) References Cited

U.S. PATENT DOCUMENTS 8,047,096 B2 * 11/2011 Ridgway ................ B62D 1/184
                                                              280/775
9,376,136 B2 *  6/2016 Yoshihara ............. B62D 1/184
(Continued)

FOREIGN PATENT DOCUMENTS

JP    61-125963 A    6/1986
JP    08-067257 A    3/1996
(Continued)

OTHER PUBLICATIONS

Written Opinion of the International Searching Authority of PCT/JP2015/055881 dated May 19, 2015.
(Continued)

*Primary Examiner* — Karen Beck
(74) *Attorney, Agent, or Firm* — Sughrue Mion, PLLC

(57) ABSTRACT

A steering device includes a cylindrical inner column, a cylindrical outer column, a column bracket, a tilt bolt, a lock member attached to the outer periphery of the tilt bolt, a first fixing mechanism, and a second fixing mechanism. The first fixing mechanism clamps the outer column by a pressing bracket in response to the rotation of an operation lever. The second fixing mechanism urges the lock member to the inner column in the tilt direction in response to the rotation of the operation lever. When the inner column moves toward a front side of a vehicle body in a state where the first fixing mechanism and the second fixing mechanism are fixed, the lock member separates from the tilt bolt.

19 Claims, 13 Drawing Sheets

(56) References Cited

U.S. PATENT DOCUMENTS

| | | | |
|---|---|---|---|
| 2007/0068311 A1 | 3/2007 | Shimoda et al. | |
| 2009/0282945 A1 | 11/2009 | Streng et al. | |
| 2011/0185839 A1 | 8/2011 | Inoue | |
| 2015/0266499 A1* | 9/2015 | Yoshihara | B62D 1/184 74/493 |
| 2016/0272235 A1* | 9/2016 | Takahashi | B62D 1/184 |

FOREIGN PATENT DOCUMENTS

| | | |
|---|---|---|
| JP | 2004-168196 A | 6/2004 |
| JP | 2004-224142 A | 8/2004 |
| JP | 2005-138758 A | 6/2005 |
| JP | 2007-069800 A | 3/2007 |
| JP | 2007-091118 A | 4/2007 |
| JP | 2010-247798 A | 11/2010 |
| JP | 2012-180039 A | 9/2012 |
| JP | 2013-169912 A | 9/2013 |

OTHER PUBLICATIONS

International Search Report of PCT/JP2015/055881 dated May 19, 2015.

* cited by examiner

STEERING DEVICE

CROSS REFERENCE TO RELATED APPLICATIONS

This is a National Stage of International Application No. PCT/JP2015/055881 filed Feb. 27, 2015, claiming priority based on Japanese Patent Application No. 2014-082178 filed Apr. 11, 2014 and Japanese Patent Application No. 2014-116433 filed Jun. 5, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward a front side of the vehicle body, a part of the capsule is cut so that the steering column moves toward the front side of the vehicle body, and hence a driver (an operator) is protected from the upthrust (secondary collision) of the steering wheel.

PRIOR ART

Prior Art 1: Japanese Patent Application Laid-open No. 2007-69800

As in the technique disclosed in Prior Art 1 in which the steering column is attached to the vehicle body through the capsule, the steering column drops when the capsule is cut. For this reason, when a setting value of a separation load causing the steering column to move toward the front side of the vehicle body is decreased in order to protect an operator having a light weight from the secondary collision, the steering column is apt to drop due to an erroneous operation. When the steering column drops due to the erroneous operation, it is difficult to perform the steering operation later. For this reason, it is difficult to decrease the setting value of the separation load.

The invention is made in view of the above-described circumstances, and an object of the invention is to provide a steering device capable of suppressing a problem in which a steering column drops due to an erroneous operation even when a setting value of a separation load causing a steering wheel to move toward a front side of a vehicle body is decreased.

SUMMARY OF THE INVENTION

It is an object of the present invention to at least partially solve the problems in the conventional technology. According to an aspect of the invention, a steering device includes an inner column having a cylindrical shape and rotatably supporting an input shaft connected to a steering wheel; an outer column that is a cylindrical member into which at least a part of the inner column is inserted, the outer column having a slit formed by notching an end from which the inner column is inserted; a column bracket fixed to a vehicle body side member and clamping the outer column by a pressing bracket squeezing the outer column; a tilt bolt penetrating the pressing bracket, and interlocked with an operation lever; a lock member attached to an outer periphery of the tilt bolt; a first fixing mechanism clamping the outer column in response to the rotation of the operation lever; and a second fixing mechanism urging the lock member to the inner column in the tilt direction in response to the rotation of the operation lever. The lock member separates from the tilt bolt when the inner column moves toward a front side of a vehicle body in a state where the first fixing mechanism clamps the outer column and the second fixing mechanism urges the lock member to the inner column in the tilt direction.

With this structure, the outer column is supported by the vehicle body through the vehicle body side member. Accordingly, when a force is transmitted from the steering wheel to the steering column in the event of a secondary collision, the inner column is inserted into the outer column so as to be accommodated in the outer column. In this case, the outer column is fixed to the vehicle body. For this reason, even when the inner column is inserted into the outer column by an erroneous operation, the steering column does not drop. Even when the squeezing pressure of the column bracket is decreased so as to decrease the friction force generated between the inner column and the outer column, the second fixing mechanism urges the lock member to the inner column in the tilt direction. Accordingly, the possibility that a load caused by a factor other than the secondary collision exceeds the separation load decreases. For this reason, the setting value of the separation load of moving the steering wheel toward the front side of the vehicle body can be decreased in order to reduce an impact of the secondary collision for the operator having a light weight.

As a desirable aspect of the invention, the lock member is a cylindrical member into which the tilt bolt is penetrable, and the lock member includes an opening portion provided at the rear side of the vehicle body in relation to the tilt bolt, the opening portion is a notch formed from one end to the other end in the axial direction of the tilt bolt, and a contact portion provided near the inner column in relation to the opening portion to contact the inner column. Accordingly, since the lock member has a cylindrical shape in a normal use state, the concern that the lock member falls off from the tilt bolt is suppressed. Further, since the opening portion is provided, the lock member is movable forward by the friction force transmitted through the contact portion in the event of a secondary collision, and hence the lock member can be separated from a second rotation cam portion. Thus, the steering device can suppress the concern of the falling off of the lock member in a normal use state and separate the lock member in the event of a secondary collision.

As a desirable aspect of the invention, a first distance that is a minimum distance from a rotation shaft of the tilt bolt to an outer peripheral surface of the inner column in a state where the fixing of the second fixing mechanism is released, is smaller than a second distance that is a distance from the rotation shaft to a surface of the contact portion, and the first distance is larger than a third distance that is a maximum distance from the rotation shaft to a surface other than the contact portion of the lock member. Accordingly, the contact portion can contact the inner column in response to the rotation of the operation lever, and the lock member does not contact the inner column when the operation lever rotates in the reverse direction. For this reason, the steering device can easily select a released state and a fixed state by the rotation of the operation lever.

As a desirable aspect of the invention, the lock member includes a metallic contact portion and a holding portion provided at a side of the tilt bolt in relation to the contact portion to contact the tilt bolt, and the holding portion is formed of a material having an elastic modulus smaller than the contact portion. Accordingly, since the contact portion is formed of metal, the friction force generated between the inner column and the lock member is easily stabilized. Meanwhile, since the holding portion is formed of resin having an elastic modulus smaller than metal, the deformation amount of the lock member is easily adjusted. Thus, the steering device can suppress a variation of the separation load of the lock member and easily set the separation load.

As a desirable aspect of the invention, the lock member includes a tooth portion provided on a surface of the contact portion. Accordingly, the friction force generated between the inner column and the contact portion is easily stabilized. Thus, the steering device can suppress a variation of the separation load of the lock member.

As a desirable aspect of the invention, the lock member is a cylindrical member into which the tilt bolt is penetrable, and the lock member includes an opening portion provided at a rear side of the vehicle body in relation to the tilt bolt, the opening portion is a notch formed from one end to the other end in the axial direction of the tilt bolt, a contact portion provided near the inner column in relation to the opening portion to contact the inner column, and a gear lock rail fixed to the inner column.

Accordingly, since the lock member has a cylindrical shape in a normal use state, the concern that the lock member falls off from the tilt bolt is suppressed. Further, the lock member engages with the gear lock rail fixed to the inner column in the contact portion. Further, since the opening portion is provided, the lock member is reliably movable forward by the friction force transmitted from the gear lock rail fixed to the inner column through the contact portion in the event of a secondary collision, and hence the lock member can be separated from the second rotation cam portion. Thus, the steering device can suppress the concern of the falling off of the lock member in a normal use state and reliably separate the lock member in the event of a secondary collision.

As a desirable aspect of the invention, the second fixing mechanism includes a gear lock rail fixed to the inner column, and the lock member is a cylindrical member into which the tilt bolt is penetrable, and the lock member includes an opening portion which is a notch formed from one end to the other end in the axial direction of the tilt bolt and is provided at a rear side of the vehicle body in relation to the tilt bolt, and a contact portion provided near the inner column in relation to the opening portion to contact the gear lock rail. Accordingly, since the lock member has a cylindrical shape in a normal use state, the concern that the lock member falls off from the tilt bolt is suppressed. Further, the lock member engages with the gear lock rail fixed to the inner column in the contact portion. Further, since the opening portion is provided, the lock member is reliably movable forward by the friction force transmitted from the gear lock rail fixed to the inner column through the contact portion in the event of a secondary collision, and hence the lock member can be separated from the second rotation cam portion. Thus, the steering device can suppress the concern of the falling off of the lock member in a normal use state and reliably separate the lock member in the event of a secondary collision.

As a desirable aspect of the invention, a first distance that is a minimum distance from a rotation shaft of the tilt bolt to an outer peripheral surface of the gear lock rail fixed to the inner column in a state where fixing of the second fixing mechanism is released, is smaller than a second distance that is a distance from the rotation shaft to a surface of the contact portion, and the first distance is larger than a third distance that is a maximum distance from the rotation shaft to a surface other than the contact portion of the lock member. Accordingly, the contact portion can contact the gear lock rail fixed to the inner column in response to the rotation of the operation lever, and the lock member does not contact the gear lock rail fixed to the inner column when the operation lever rotates in the reverse direction. For this reason, the steering device can easily select a released state and a fixed state by the rotation of the operation lever.

As a desirable aspect of the invention, the lock member includes a metallic contact portion and a holding portion provided near the tilt bolt in relation to the contact portion to contact the tilt bolt, and the holding portion is formed of a material having an elastic modulus smaller than the contact portion. Accordingly, since the contact portion is formed of metal, a force generated between the lock member and the gear lock rail fixed to the inner column is transmitted without any loss. Meanwhile, since the holding portion is formed of resin having an elastic modulus smaller than metal, the deformation amount of the lock member is easily adjusted. Thus, the steering device can suppress a variation of the separation load of the lock member and easily set the separation load.

As a desirable aspect of the invention, the lock member and the gear lock rail engage with each other at the surfaces thereof, and the surface of the contact portion is provided with a tooth portion. Accordingly, the contact portion engages with the gear lock rail fixed to the inner column so that a force is transmitted therebetween without any loss. Thus, the steering device can suppress a variation of the separation load of the lock member.

As a desirable aspect of the invention, the outer column is located at the front side of the vehicle body, includes a pivot bracket, and is provided so that the separated inner column is insertable thereinto.

Accordingly, the axial direction of the outer column becomes easily parallel to the axial direction of the inner column. For this reason, the outer column can easily guide the inner column when the inner column moves in the axial direction. Thus, since the inner column moves straight smoothly in the axial direction, it is possible to suppress a concern that the movement of the inner column may be disturbed or the friction force generated between the inner column and the outer column may become larger than a predetermined value.

As a desirable aspect of the invention, the lock member separates from the tilt bolt along with a part of the tilt bolt when the inner column moves toward the front side of the vehicle body in the state where the first fixing mechanism clamps the outer column and the second fixing mechanism urges the lock member to the inner column in the tilt direction. Accordingly, the separation load of the lock member depends on the shear strength of the shearing portion. The shear strength of the shearing portion is easily set compared with the setting of the rigidity of the lock member. For this reason, the separation load of the lock member is easily set.

As a desirable aspect of the invention, the tilt bolt includes two bolt bodies which respectively penetrate the pressing brackets at both sides of the outer column and a shearing portion which is disposed between two bolt bodies and has an outer periphery smaller than the outer peripheries of the bolt bodies, and the lock member is attached to the shearing portion. Accordingly, the shearing portion is shear-fractured in response to the forward force applied to the lock member.

For this reason, the separation load of the lock member depends on the shear strength of the shearing portion. The shear strength of the shearing portion is easily set compared with the setting of the rigidity of the lock member. Further, the shearing force applied to the shearing portion is apt to be equal at both sides of the lock member. Thus, the separation load of the lock member is easily set.

As a desirable aspect of the invention, the tilt bolt includes two bolt bodies which respectively penetrate the pressing brackets at both sides of the outer column and two shearing portions which are disposed between two bolt bodies and have outer peripheries smaller than the outer peripheries of the bolt bodies, and the lock member is disposed between two shearing portions. Accordingly, the shearing portion is shear-fractured in response to the forward force applied to the lock member. For this reason, the separation load of the lock member depends on the shear strength of the shearing portion. The shear strength of the shearing portion is easily set compared with the setting of the rigidity of the lock member. Further, the shearing force applied to the shearing portion is apt to be equal at both sides of the lock member. Thus, the separation load of the lock member is easily set.

As a desirable aspect of the invention, an edge of the shearing portion is chamfered. Accordingly, even when a tensile force is applied to the shearing portion, a crack is not easily generated from the edge as a starting point. For this reason, since the shear strength of the shearing portion is stabilized, the separation load of the lock member is stabilized.

According to the invention, it is possible to provide a steering device capable of suppressing a steering column from dropping by an erroneous operation even when a setting value of a separation load of causing a steering wheel to move toward a front side of a vehicle body is decreased.

DETAILED DESCRIPTION OF THE PREFERRED EMBODIMENT

A mode (an embodiment) for carrying out the invention will be described in detail with reference to the drawings. The invention is not limited to the content described in the embodiments below. Further, components described below include a component which is easily supposed by a person skilled in the art and a component which has substantially the same configuration. Further, the components described below can be appropriately combined with one another.

Embodiment

Figure 1:
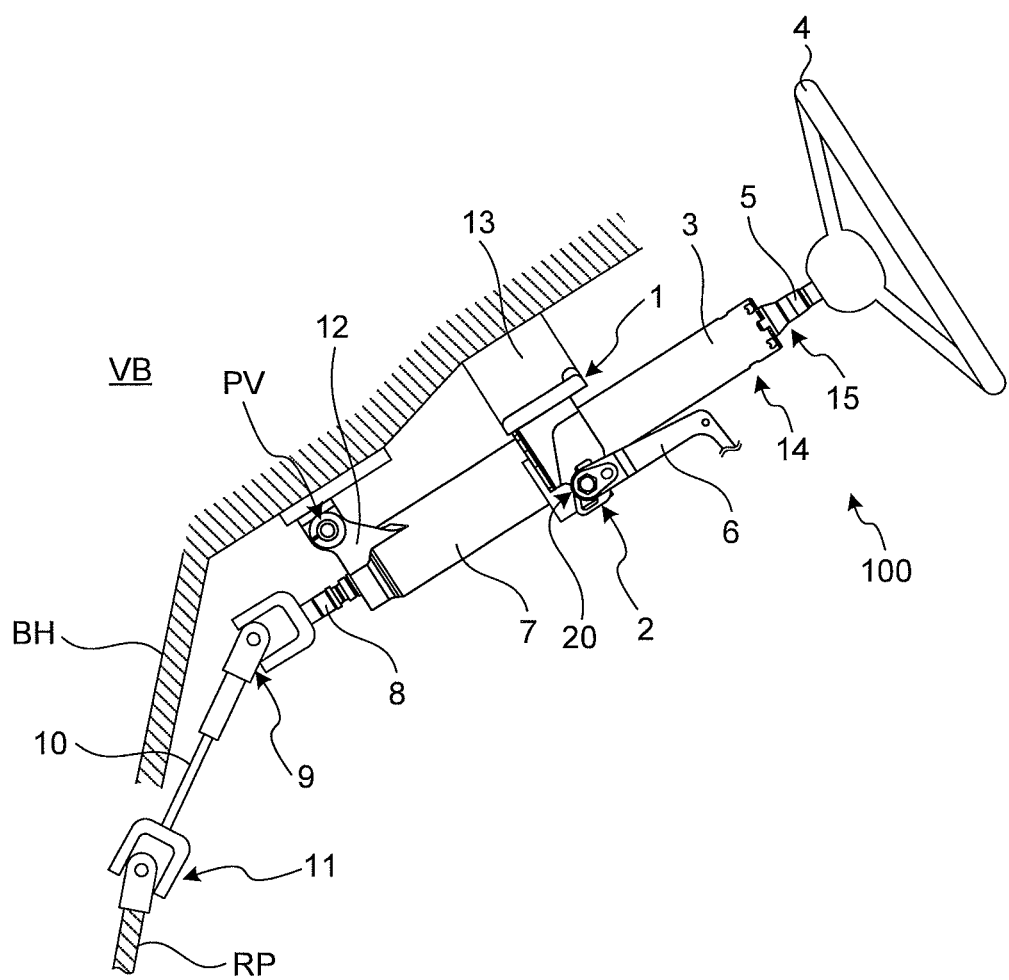
FIG. 1 is a diagram illustrating an attachment state of a steering device according to an embodiment.

FIG. 1 is a diagram illustrating a composition of a steering device according to an embodiment. Referring to FIG. 1, the outline of the steering device according to the embodiment will be described. Further, in the description below, the front side of the vehicle body when a steering device 100 is attached to the vehicle body will be simply referred to as the front side, and the rear side of the vehicle body when the steering device 100 is attached to the vehicle body will be simply referred to as the rear side. In FIG. 1, the front side indicates the left side of the drawing, and the rear side indicates the right side of the drawing.

The steering device 100 is provided in a vehicle body VB, and includes a steering wheel 4, a steering shaft 15, a universal joint 9, a lower shaft 10, a universal joint 11, and a rack and pinion RP in order in which a force applied from an operator is transmitted.

The steering shaft 15 includes an input shaft 5 and an output shaft 8. In the input shaft 5, one end is connected to the steering wheel 4 and the other end is connected to the output shaft 8. In the output shaft 8, one end is connected to the input shaft 5 in the steering column and the other end therein is connected to the universal joint 9. In the embodiment, the input shaft 5 and the output shaft 8 are formed of general steel such as SPCC (Steel Plate Cold Commercial).

In the lower shaft 10, one end is connected to the universal joint 9 and the other end is connected to the universal joint 11. In the rack and pinion RP, one end is connected to the universal joint 11.

Further, the steering device 100 includes a steering column 14 that includes a cylindrical inner column 3 which rotatably supports the input shaft 5 and a cylindrical outer column 7 into which at least a part of the inner column 3 is inserted. The inner column 3 is disposed at the rear side of the outer column 7. In the description below, the axial direction of the inner column 3 and the axial direction of the outer column 7 will be appropriately simply referred to as the axial direction.

The steering device 100 includes a column bracket 1 which is fixed to a vehicle body side member 13 and supports the outer column 7. The column bracket 1 is fixed to the vehicle body side member 13 by a bolt or the like so as not to be separable therefrom.

Further, the outer column 7 includes a pivot bracket 12 which is provided at the front end. The pivot bracket 12 is supported by the vehicle body VB so as to be rotatable about the rotation shaft PV. The rotation shaft PV is parallel to, for example, the horizontal direction. Accordingly, the outer column 7 is supported so as to be swingable in the vertical direction. An operator can adjust the position of the steering column 14 in the tilt direction by tilting the steering column 14 with the steering wheel 4 after rotating an operation lever 6. Further, the operator can adjust the telescopic position by moving the inner column 3 with the steering wheel 4 after rotating the operation lever 6.

The lower shaft 10 is disposed near a bulkhead BH having a partition-wall shape and partitioning a vehicle room and an engine room. The pinion of the rack and pinion RP engages with a rack shaft (not illustrated).

Accordingly, a steering torque (including an auxiliary steering torque) output through the output shaft 8 is transmitted to the lower shaft 10 through the universal joint 9, and then is transmitted to the pinion through the universal joint 11. The steering force transmitted to the pinion is transmitted to a tie rod (not illustrated) through a steering gear (not illustrated) and a rack (not illustrated), so that a steering wheel (not illustrated) is steered.

With the above-described structure, the outer column 7 is supported by the vehicle body VB through the vehicle body side member 13. Accordingly, when a force is transmitted from the steering wheel 4 to the steering column 14 in the event of a secondary collision, the inner column 3 is inserted into the outer column 7 and accommodated therein while the outer column 7 is fixed to the vehicle body VB, and hence an impact applied from the steering wheel 4 to the operator can be reduced. When the weight of the operator is light, the setting value of the separation load in which the inner column 3 of the steering column 14 moves toward the front side of the vehicle body can be decreased. Accordingly, a pressure generated by the squeezing of the column bracket 1 is decreased so as to decrease a friction force between the inner column 3 and the outer column 7. However, when the friction force generated between the inner column 3 and the outer column 7 is too low, there is a possibility that a load generated by a factor other than the secondary collision may also exceed the separation load. For this reason, the steering device 100 of the embodiment includes a second fixing mechanism 2 in addition to a first fixing mechanism 20 which generates a pressure while being squeezed by the column bracket 1.

Figure 2:
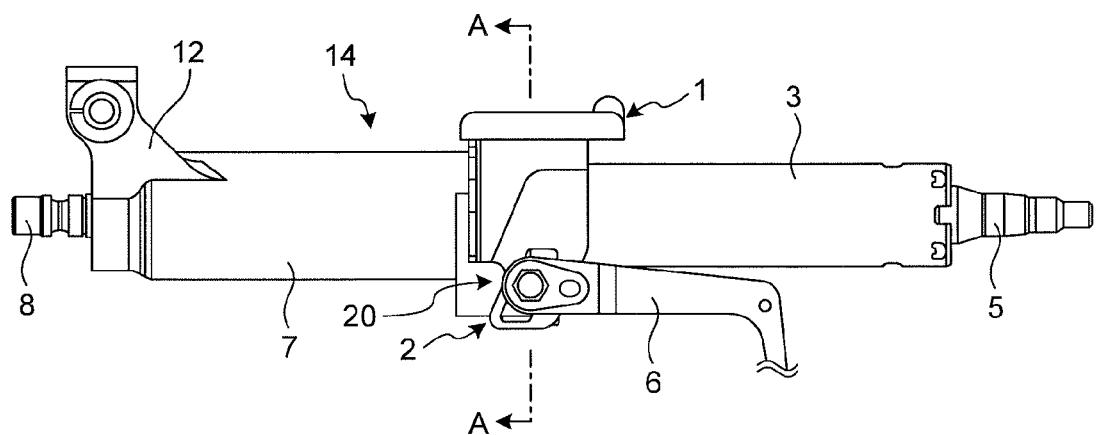
FIG. 2 is a schematic side view of a steering column of the steering device according to the embodiment.
Figure 3:
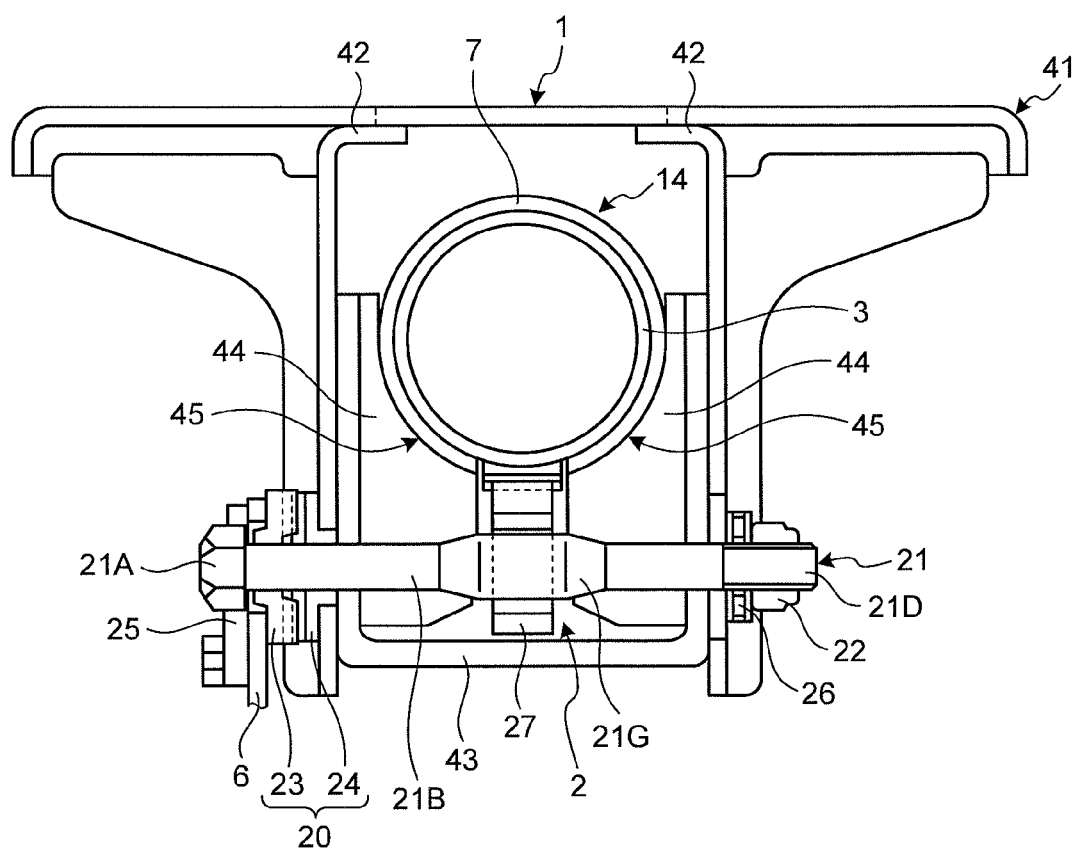
FIG. 3 is a cross-sectional view taken along the line A-A of FIG. 2.
Figure 4:
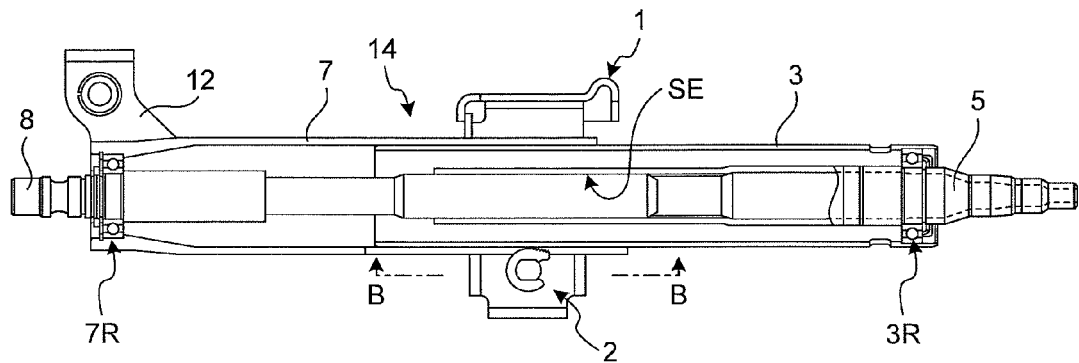
FIG. 4 is a schematic cross-sectional view illustrating a cross-section including rotation shafts of input and output shafts of FIG. 2.
Figure 5:
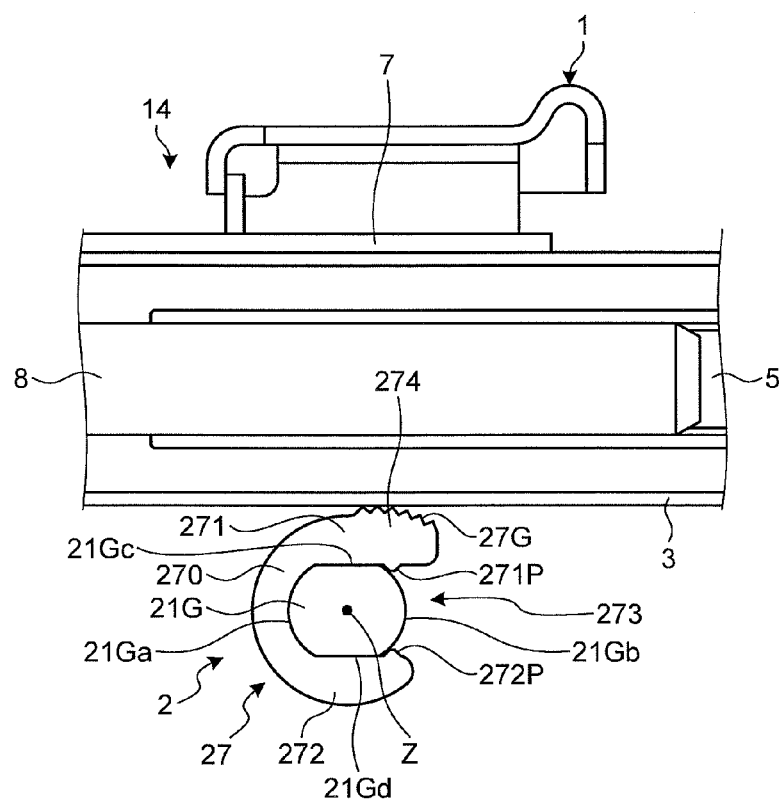
FIG. 5 is a diagram illustrating a state where a second fixing mechanism according to the embodiment is fixed.
Figure 6:
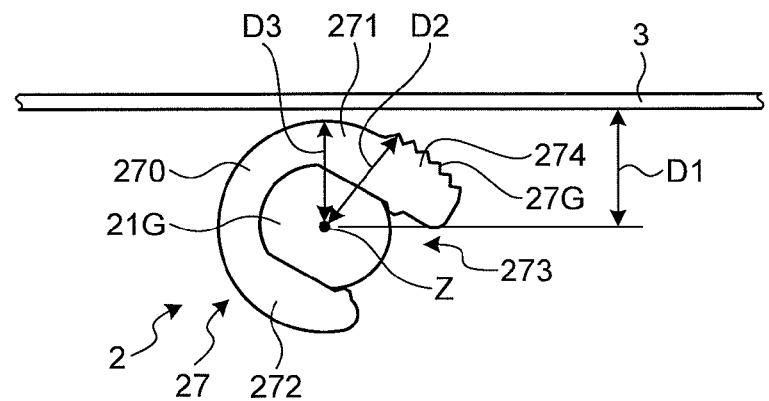
FIG. 6 is a diagram illustrating a state where the fixing of the second fixing mechanism according to the embodiment is released.
Figure 7:
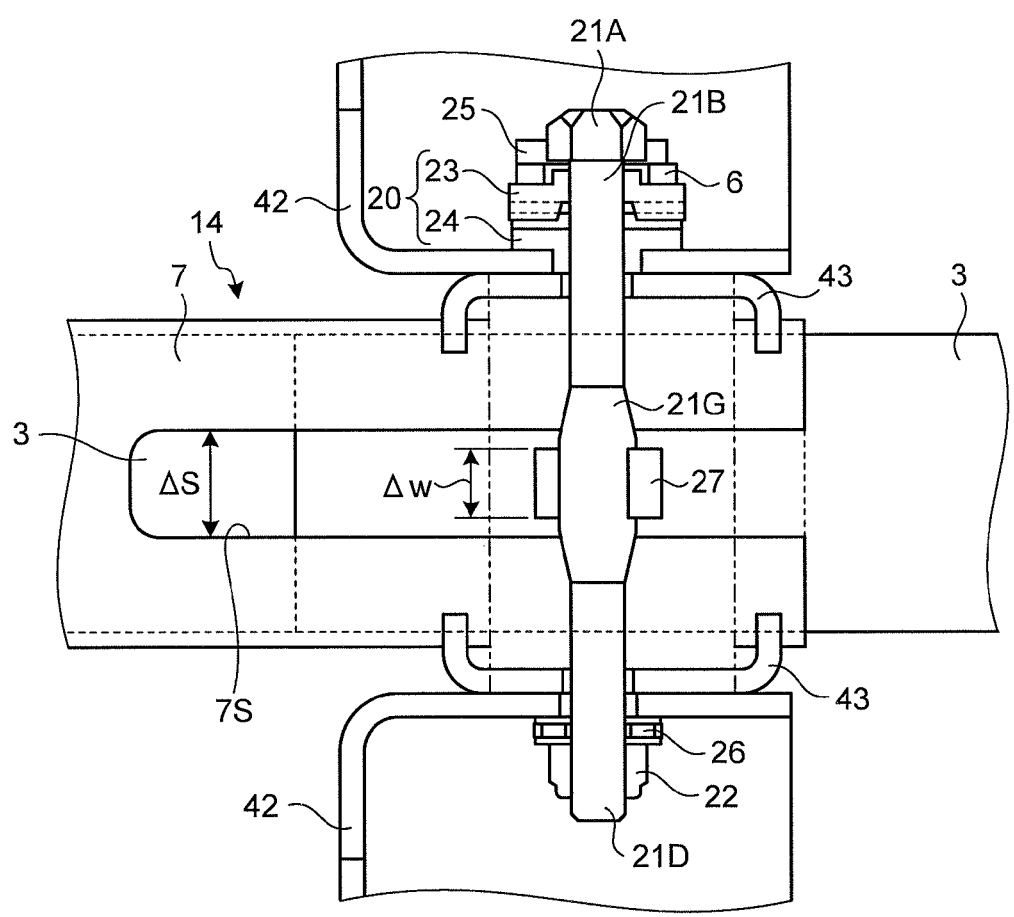
FIG. 7 is a top view illustrating the second fixing mechanism according to the embodiment when viewed from the downside in the tilt direction.

FIG. 2 is a schematic side view of a steering column of the steering device according to the embodiment. FIG. 3 is a cross-sectional view taken along the line A-A of FIG. 2. FIG. 4 is a schematic cross-sectional view illustrating a cross-section including rotation shafts of input and output shafts of FIG. 2. FIG. 5 is a diagram illustrating a state where a second fixing mechanism according to the embodiment is fixed. FIG. 6 is a diagram illustrating a state where the fixing of the second fixing mechanism according to the embodiment is released. FIG. 7 is a top view illustrating the second fixing mechanism according to the embodiment when viewed from the downside in the tilt direction. Further, FIG. 7 is a top view when viewed from the direction B-B of FIG. 4. Referring to FIGS. 1 to 7, the second fixing mechanism 2 of the steering device 100 will be described.

In addition, the input shaft 5 and the output shaft 8 are not illustrated in FIG. 3. For example, as illustrated in FIG. 4, the inner column 3 includes a bearing 3R which rotatably supports the input shaft 5. The outer column 7 includes a bearing 7R which rotatably supports the output shaft 8. The inner column 3 is inserted into the outer column 7 so that at least a part of the outer periphery surface faces the inner surface of the outer column 7. Here, the facing portion is provided with a power transmission mechanism SE such as a serration or a spline, and hence the rotation of the input shaft 5 can be transmitted as the rotation of the output shaft 8.

As illustrated in FIG. 3 as the cross-section taken along the line A-A of FIG. 2, the column bracket 1 includes a mounting plate portion 41 which is fixed to the vehicle body side member 13 illustrated in FIG. 1 and a pressing bracket 42 which is fixed to the mounting plate portion 41 so as to squeeze the outer column 7. The pressing bracket 42 is disposed at both sides of the outer column 7, and hence can clamp the outer column 7 through a distance bracket 43. Further, the pressing bracket 42 is provided with a tilt adjustment hole as an elongated hole in the tilt direction (the up and down direction of the vehicle body VB), and a tilt bolt 21 which rotates with the rotation of the operation lever 6 can be inserted thereinto. The distance bracket 43 includes a positioning portion 44 which includes a semi-circular concave portion for positioning the outer column 7, and is fixed, by welding or the like, to a fixed position 45 contacting the outer column 7. The outer column 7 and the distance bracket 43 are integrally molded by aluminum die-casting or magnesium die-casting.

The first fixing mechanism 20 is a cam mechanism and includes a first rotation cam portion 23 which is attached to the operation lever 6 so as to rotate together and a first fixed cam portion 24 which is attached to the tilt adjustment hole of the column bracket 1 so as to be slidable and not to relatively rotate with the rotation of the operation lever 6. The first rotation cam portion 23 and the first fixed cam portion 24 are formed so that unevenness is formed in the circumferential direction. Then, when the first rotation cam portion 23 and the first fixed cam portion 24 are rotated relatively, the distance between the first rotation cam portion and the first fixed cam portion changes in response to the rotation position of the first rotation cam portion 23.

The tilt bolt 21 includes a tilt bolt head portion 21A, a bolt body 21B, a second rotation cam portion 21G, and a screw portion 21D. The tilt bolt 21 penetrates through the operation lever 6, the first rotation cam portion 23, the first fixed cam portion 24, the pressing bracket 42, the distance bracket 43, the pressing bracket 42, and a thrust bearing 26. The screw portion 21D is coupled to a caulking nut 22. A spin stopper 25 which is fixed to the tilt bolt head portion 21A synchronizes the rotation of the operation lever 6 and the rotation of the tilt bolt 21 and the first rotation cam portion 23 by squeezing the first fixed cam portion 24 and the operation lever 6. Since the distance between the first rotation cam portion 23 and the first fixed cam portion 24 changes in response to the rotation position of the first rotation cam portion 23, the thrust bearing 26 is movable in the axial direction of the tilt bolt 21.

Further, since the distance between the first rotation cam portion 23 and the first fixed cam portion 24 changes in response to the rotation position of the first rotation cam portion 23, the pressure of squeezing the pressing brackets 42 decreases when the distance between the first rotation cam portion 23 and the first fixed cam portion 24 decreases. For this reason, a clamping force generated between the pressing brackets 42 can be loosened in response to the rotation of the operation lever 6, and hence a friction force between the pressing brackets 42 and a friction force with respect to the outer column 7 becomes zero or decreases. Accordingly, by rotating the operation lever 6, the operator can tilt the steering column 14 in a vertical direction along the length direction of the tilt adjustment hole with the steering wheel 4. Then, the operator can adjust the tilt position of the outer column 7. Further, when the clamping force generated between the pressing brackets 42 can be loosened in response to the rotation of the operation lever 6, the width of a slit 7S of the outer column 7 illustrated in FIG. 7 increases. Accordingly, since a force with which the outer column 7 clamps the inner column 3 is lost or becomes zero, a friction force generated by the sliding of the inner column 3 becomes zero. As a result, the operator can adjust the telescopic position.

Further, when the distance between the first rotation cam portion 23 and the first fixed cam portion 24 increases, the pressure of squeezing the pressing brackets 42 increases. For this reason, the tilt position of the steering column 14 can be fixed by the rotation of the operation lever 6. Further, when the operation lever 6 is rotated, the squeezing pressure of the column bracket 1 increases, and a friction force generated between the inner column 3 and the outer column 7 increases. Thus, the telescopic position can be fixed.

In this way, a clamping force generated between the pressing brackets 42 can be loosened in response to the rotation of the operation lever 6, and hence a friction force generated between the pressing brackets 42 and a friction force with respect to the outer column 7 becomes zero or decreases. Accordingly, the tilt position of the outer column 7 can be adjusted. Further, when the clamping force generated between the pressing brackets 42 is loosened by the rotation of the operation lever 6, the width of the slit 7S of the outer column 7 illustrated in FIG. 7 increases. Accordingly, since a force with which the outer column 7 clamps the inner column 3 becomes zero, a friction force generated by the sliding of the inner column 3 becomes zero. Accordingly, the operator can adjust the telescopic position by pressing the inner column 3 with the steering wheel 4 after rotating the operation lever 6.

The second fixing mechanism 2 is a cam mechanism and includes the second rotation cam portion 21G of the tilt bolt 21 which rotates along with the operation lever 6 and a lock member 27.

As illustrated in FIG. 5, the second rotation cam portion 21G is a member having an oval-shaped cross-section orthogonal to the rotation shaft Z of the tilt bolt 21. The second rotation cam portion 21G includes a front circular-arc portion 21Ga, a rear circular-arc portion 21Gb, and flat portions 21Gc and 21Gd. The front circular-arc portion 21Ga is a circular-arc outer peripheral surface which is located at the front side of the rotation shaft Z. The rear circular-arc portion 21Gb is a circular-arc outer peripheral surface which is located at the rear side of the rotation shaft Z. The flat portion 21Gc is a flat outer peripheral surface which is provided from the front circular-arc portion 21Ga toward the rear circular-arc portion 21Gb at the side of the inner column 3 in relation to the rotation shaft Z. The flat portion 21Gd is an outer peripheral surface which is parallel to the flat portion 21Gc provided from the front circular-arc portion 21Ga toward the rear circular-arc portion 21Gb at the opposite side to the inner column 3 in relation to the rotation shaft Z. In addition, the cross-sectional shape of the second rotation cam portion 21G orthogonal to the rotation shaft Z may not be essentially an oval shape, but may be a circular shape or a polygonal shape.

The lock member 27 is, for example, a cylindrical member through which the second rotation cam portion 21G is insertable. The lock member 27 includes, for example, a base portion 270, a first arm portion 271, a second arm portion 272, and an opening portion 273. The base portion 270 is disposed at the front side of the second rotation cam portion 21G and has a shape following the front circular-arc portion 21Ga. The first arm portion 271 is provided along the flat portion 21Gc from the end of the base portion 270 near the inner column 3. The second arm portion 272 is provided along the flat portion 21Gd from the end of the base portion 270 opposite to the inner column 3. The base portion 270, the first arm portion 271, and the second arm portion 272 are formed of, for example, metal such as steel so as to be integrated with one another. The opening portion 273 is a notch formed from one end to the other end in the axial direction of the tilt bolt 21, and is disposed at the rear side of the second rotation cam portion 21G. The first arm portion 271 and the second arm portion 272 protrude backward from the flat portions 21Gc and 21Gd and face each other with the opening portion 273 interposed therebetween. The first arm portion 271 includes a protrusion portion 271P which protrudes toward the second arm portion 272 at the rear side of the flat portion 21Gc. The second arm portion 272 includes a protrusion portion 272P which protrudes toward the first arm portion 271 at the rear side of the flat portion 21Gd. The protrusion portions 271P and 272P contact the edge of the rear circular-arc portion 21Gb. In addition, the lock member 27 may be formed of metal such as aluminum alloy, a sintered material, resin, or engineering plastics or industrial plastics.

Further, the first arm portion 271 includes a contact portion 274 which is able to contact the inner column 3 in response to the rotation of the operation lever 6. The contact portion 274 is provided near the inner column 3 in relation to the opening portion 273. The surface of the contact portion 274 is provided with a tooth portion 27G. As illustrated in FIG. 6, the first distance D1, which is the minimum distance from the rotation shaft Z to the outer peripheral surface of the inner column 3 in a state where the fixing of the second fixing mechanism 2 is released, is smaller than the second distance D2 which is the distance from the rotation shaft Z to the surface of the contact portion 274 (the front end of the tooth portion 27G). Further, the first distance D1 is larger than the third distance D3 which is the maximum distance from the rotation shaft Z to the surface other than the contact portion 274 of the lock member 27. In the embodiment, the cross-sectional shape orthogonal to the rotation shaft Z in the portion other than the contact portion 274 of the lock member 27 forms a circle centering the rotation shaft Z. That is, the third distance D3 is constant. In addition, the contact portion 274 may not include the tooth portion 27G. Further, the contact portion 274 may be subjected to knurling instead of the tooth portion 27G.

When the second rotation cam portion 21G rotates with the rotation of the operation lever 6, the position of the contact portion 274 in the tilt direction changes. When the second rotation cam portion 21G rotates in a direction in which the contact portion 274 moves close to the inner column 3 (the counter-clockwise direction of FIGS. 5 and 6), the tooth portion 27G contacts the inner column 3. Accordingly, the lock member 27 is urged to the inner column 3 in the tilt direction. For this reason, since the outer peripheral surface of the inner column 3 is pressed upward in the tilt direction in the inner peripheral surface of the outer column 7, the friction force generated between the inner column 3 and the outer column 7 increases. In this case, the distance between the first rotation cam portion 23 and the first fixed cam portion 24 decreases. For this reason, a friction force is generated by the second fixing mechanism 2 between the inner column 3 and the outer column 7 in addition to the friction force generated by the first fixing mechanism 20. Accordingly, the first fixing mechanism 20 and the second fixing mechanism 2 fix the inner column 3 so that the telescopic position does not change due to a load of a factor other than the secondary collision.

When the second rotation cam portion 21G rotates in a direction in which the contact portion 274 moves away from the inner column 3 (the clockwise direction of FIGS. 5 and 6), the lock member 27 moves away from the outer peripheral surface of the inner column 3 so that the pressing force applied from the lock member 27 to the inner column 3 is released as illustrated in FIG. 6. In this case, the distance between the first rotation cam portion 23 and the first fixed cam portion 24 increases. Accordingly, the operator can adjust the tilt position and the telescopic position.

As illustrated in FIG. 7, the lock member 27 is attached to the second rotation cam portion 21G so as to face the outer peripheral surface of the inner column 3 exposed from the slit 7S of the outer column 7. The width Δw of the lock member 27 in the axial direction of the tilt bolt 21 is smaller than the width ΔS of the slit 7S. Accordingly, the lock member 27 does not disturb a clamping force generated between the pressing brackets 42.

Figure 8:
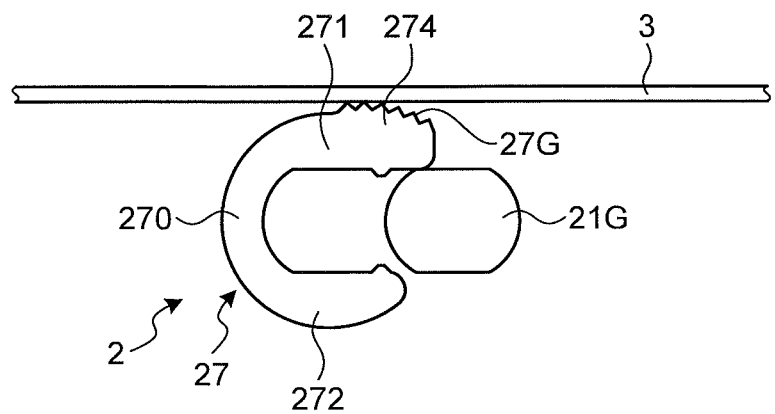
FIG. 8 is a diagram illustrating a state of the second fixing mechanism according to the embodiment in the event of a secondary collision.

FIG. 8 is a diagram illustrating a state of the second fixing mechanism according to the embodiment in the event of a secondary collision. In a state where the first fixing mechanism 20 clamps the outer column 7 and the second fixing mechanism 2 urges the lock member 27 toward the inner column 3 in the tilt direction, a friction force is generated between the tooth portion 27G and the inner column 3. Accordingly, when the inner column 3 moves forward due to the secondary collision, a forward force is applied to the lock member 27. When the lock member 27 moves forward, the protrusion portions 271P and 272P contacting the edge of the rear circular-arc portion 21Gb receive a reaction force in a direction in which the distance between the protrusion portions 271P and 272P is widened from the second rotation cam portion 21G. Accordingly, the lock member 27 is deformed so as to widen the width of the opening portion 273 in the circumferential direction of the second rotation cam portion 21G. Subsequently, the protrusion portion 271P rides on the flat portion 21Gc and the protrusion portion 272P rides on the flat portion 21Gd. For this reason, as illustrated in FIG. 8, the lock member 27 becomes movable forward, and can be separated from the second rotation cam portion 21G by the forward force applied from the inner column 3.

In the embodiment, a force which is applied to the lock member 27 when the protrusion portion 271P rides on the flat portion 21Gc and the protrusion portion 272P rides on the flat portion 21Gd is the separation load of the lock member 27. For this reason, the separation load depends on the entire elastic modulus of the lock member 27 and the sizes of the protrusion portions 271P and 272P.

Further, in a state where the first fixing mechanism 20 clamps the outer column 7 and the second fixing mechanism 2 urges the lock member 27 to the inner column 3 in the tilt direction, the lock member 27 receives a reaction force directed downward in the tilt direction from the inner column 3. For this reason, when the lock member 27 is separated from the second rotation cam portion 21G, a forward force and a downward force in the tilt direction are applied to the lock member 27. Accordingly, there is a possibility that the lock member 27 separated from the second rotation cam portion 21G may be deformed differently compared with the case where only the forward force is applied to the lock member 27. For this reason, it is desirable to set the separation load of the lock member 27 in consideration of the downward force in the tilt direction applied from the inner column 3.

Figure 9:
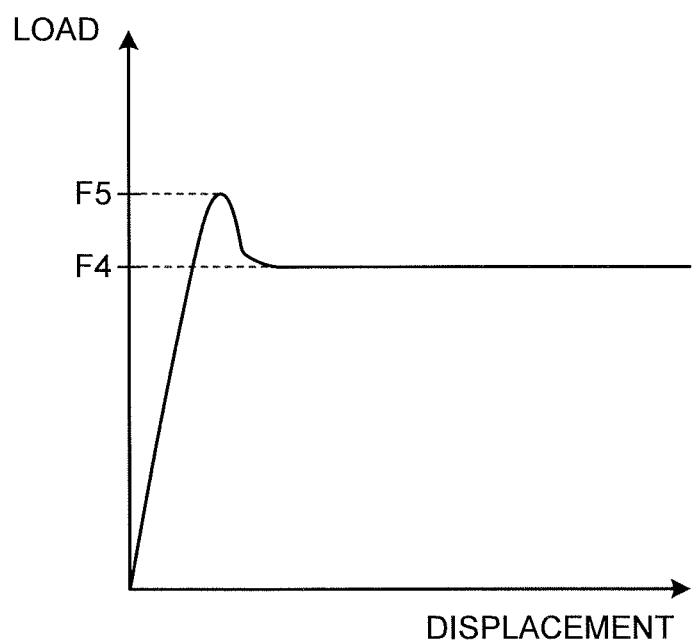
FIG. 9 is a diagram illustrating a relation between a displacement amount of a steering column and a load necessary to move the steering column of a comparative example.
Figure 10:
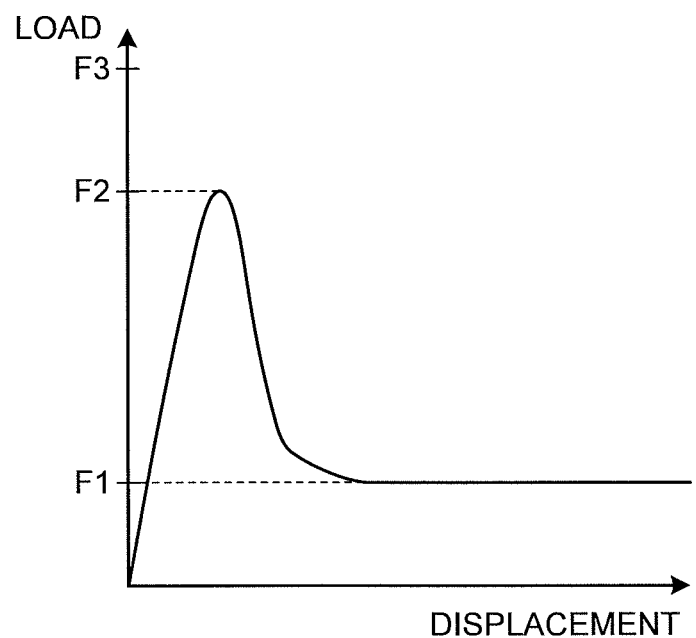
FIG. 10 is a diagram illustrating a relation between a displacement amount of a steering column and a load necessary to move the steering column of the embodiment.

FIG. 9 is a diagram illustrating a relation between a displacement amount of the steering column and a load necessary to move the steering column of the comparative example. FIG. 10 is a diagram illustrating a relation between a displacement amount of the steering column and a load necessary to move the steering column of the embodiment. In FIGS. 9 and 10, the horizontal axis indicates the forward displacement amount of the inner column 3 and the vertical axis indicates the load necessary to move the inner column forward.

The comparative example is an example in which the outer column is attached to the vehicle body through the capsule as in the technique of Prior Art 1. In the comparative example, the outer column is disposed at the rear side of the inner column. Then, when an excessive load is applied to the outer column, the rod contacts the end of the telescopic adjustment hole integrated with the outer column, and the load is transmitted to the capsule through the bracket. A force F5 illustrated in FIG. 9 indicates the allowable shearing force of the capsule.

In the comparative example, the outer column is supported in the axial direction by a friction force generated between the inner column and the outer column due to the clamping of the bracket. A force F4 illustrated in FIG. 9 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut so that the outer column is separated from the vehicle body. Subsequently, the outer column moves in the axial direction while absorbing an impact by the friction force with the inner column. However, since the force F4 is maintained at a predetermined value or more as described above, it is difficult to more easily protect the operator from the secondary collision by the smooth movement of the outer column.

Meanwhile, in the embodiment, the inner column 3 is supported in the axial direction while being fixed to the outer column 7 by a first friction force generated between the outer column 7 due to the clamping of the column bracket 1 using the first fixing mechanism 20 and a second friction force generated in the second fixing mechanism 2. A force F1 illustrated in FIG. 10 indicates a first friction force, and a force F3 indicates the sum of the first friction force and the second friction force. Further, a force F2 illustrated in FIG. 10 indicates the separation load of the lock member 27. The force F2 is smaller than the force F3 and is larger than the force F1.

In the embodiment, when a load of the force F2 or more is applied to the inner column 3, the lock member 27 is separated from the second rotation cam portion 21G. Accordingly, since the connection of the second fixing mechanism 2 is released, the second friction force is not applied to the inner column 3. For this reason, the lock member 27 is separated from the second rotation cam portion 21G, and the inner column 3 moves in the axial direction while absorbing an impact by the first friction force. In the steering device 100 according to the embodiment, when the first friction force is set to be small, the inner column 3 moves smoothly, and hence the impact of the secondary collision applied to the operator can be reduced.

In the embodiment, even when the setting value of the first friction force is small, the second friction force can compensate a decrease amount of the first friction force in the force supporting the inner column 3 in the axial direction. For this reason, since the steering device 100 according to the embodiment adjusts the added value of the setting value of the first friction force and the setting value of the second friction force, it is possible to suppress the inner column 3 from moving by the load applied in normal use and to reduce the impact of the secondary collision to the operator.

As described above, the steering device 100 according to the embodiment includes the cylindrical inner column 3, the cylindrical outer column 7, the column bracket 1, the tilt bolt 21, the lock member 27, the first fixing mechanism 20, and the second fixing mechanism 2. The inner column 3 rotatably supports the input shaft 5 connected to the steering wheel 4. The outer column 7 is a cylindrical member into which at least a part of the inner column 3 is inserted. The outer column 7 includes the slit 7S formed by notching one end thereof where the inner column 3 is inserted. The column bracket 1 is fixed to the vehicle body side member 13 and clamps the outer column 7 by the pressing bracket 42 squeezing the outer column 7. The tilt bolt 21 penetrates the pressing bracket 42 and moves along with the operation lever 6. The lock member 27 is attached to the outer periphery of the tilt bolt 21. The first fixing mechanism 20 clamps the outer column 7 by the pressing bracket 42 in response to the rotation of the operation lever 6 so as to increase the first friction force generated between the inner column 3 and the outer column 7. The second fixing mechanism 2 urges the lock member 27 to the inner column 3 in the tilt direction in response to the rotation of the operation lever 6. When the inner column 3 moves forward in a state where the first fixing mechanism 20 clamps the outer column 7 and the second fixing mechanism 2 urges the lock member 27 to the inner column 3 in the tilt direction, the lock member 27 is separated from the tilt bolt 21.

With this structure, the outer column 7 is supported by the vehicle body VB through the vehicle body side member 13. Accordingly, when a force is transmitted from the steering wheel 4 to the steering column 14 in the event of a secondary collision, the inner column 3 is inserted into the outer column 7 so as to be accommodated into the outer column 7. In this case, the outer column 7 is fixed to the vehicle body VB. Even when the inner column 3 is inserted into the outer column 7 by an erroneous operation, the steering column does not drop. Even when a squeezing pressure caused by the column bracket 1 is decreased so as to decrease a friction force generated between the inner column 3 and the outer column 7, the second fixing mechanism 2 urges the lock member 27 to the inner column 3 in the tilt direction. Accordingly, the possibility that a load caused by a factor other than a secondary collision exceeds the separation load decreases. For this reason, the setting value of the separation load of moving the steering wheel 4 (the inner column 3) toward the front side of the vehicle body can be decreased in order to reduce an impact of the secondary collision for the operator having a light weight.

When the weight of the operator is light, the setting value of the separation load in which the inner column 3 of the steering column 14 moves toward the front side of the vehicle body may be decreased. Thus, a squeezing pressure caused by the column bracket 1 is decreased so as to decrease a friction force generated between the inner column 3 and the outer column 7. The lock member 27 is separably attached to the tilt bolt 21. For this reason, when the secondary collision occurs, the lock member 27 is separated from the tilt bolt 21 so as to release the connection of the second fixing mechanism 2. Accordingly, the second friction force is not applied to the inner column 3. For this reason, the inner column 3 moves in the axial direction while absorbing an impact by the first friction force after the lock member 27 is separated from the tilt bolt 21. As a result, the steering device 100 can reduce the impact (the secondary collision) of the operator having a light weight.

The lock member 27 is a cylindrical member into which the tilt bolt 21 is insertable, and includes an opening portion 273 which is a notch formed from one end to the other end in the direction of the rotation shaft Z and formed at the rear side of the tilt bolt 21 and a contact portion 274 which is able to contact the inner column 3 and is provided near the inner column 3 in relation to the opening portion 273. Accordingly, since the lock member 27 has a cylindrical shape in a normal use state, it is possible to suppress the concern that the lock member 27 may be separated from the second rotation cam portion 21G. Further, since the opening portion 273 is provided, the lock member 27 can move forward by the friction force transmitted through the contact portion 274 in the event of a secondary collision, and hence the lock member 27 can be separated from the second rotation cam portion 21G. Thus, the steering device 100 can suppress the concern that the lock member 27 may be separated in a normal use state and can separate the lock member 27 in the event of a secondary collision.

Further, since the lock member 27 includes the opening portion 273, the lock member 27 is separated so that the second rotation cam portion 21G passes through the opening portion 273 in the event of a secondary collision. For this reason, the lock member 27 can be separated without any damage differently from the case of using the capsule to be cut partly. For this reason, the lock member 27 can be used again in the same way even when the lock member is separated.

The first distance D1 as the minimum distance from the rotation shaft Z of the tilt bolt 21 to the outer peripheral surface of the inner column 3 in a state where the fixing of the second fixing mechanism 2 is released is smaller than the second distance D2 from the rotation shaft Z to the surface of the contact portion 274 and is larger than the third distance D3 as the maximum distance from the rotation shaft Z to the surface other than the contact portion 274 of the lock member 27. Accordingly, the contact portion 274 can contact the inner column 3 in response to the rotation of the operation lever 6, and the lock member 27 does not contact the inner column 3 when the operation lever 6 rotates in the reverse direction. For this reason, the steering device 100 can easily select the released state and the fixed state by the rotation of the operation lever 6.

The lock member 27 includes the tooth portion 27G in the surface of the contact portion 274. Accordingly, the friction force generated between the inner column 3 and the contact portion 274 is easily stabilized. Thus, the steering device 100 can suppress a variation of the separation load of the lock member 27.

The outer column 7 is located at the front side, is provided with the pivot bracket 12, and is provided so that the separated inner column 3 is insertable thereinto. Accordingly, the axial direction of the outer column 7 becomes easily parallel to the axial direction of the inner column 3. For this reason, the outer column 7 can easily guide the inner column 3 when the inner column 3 moves in the axial direction. Thus, since the inner column 3 easily moves straightly in the axial direction, it is possible to suppress a possibility that the movement of the inner column 3 may be disturbed or the friction force generated between the inner column 3 and the outer column 7 may become larger than a predetermined value.

First Modified Example

Figure 11:
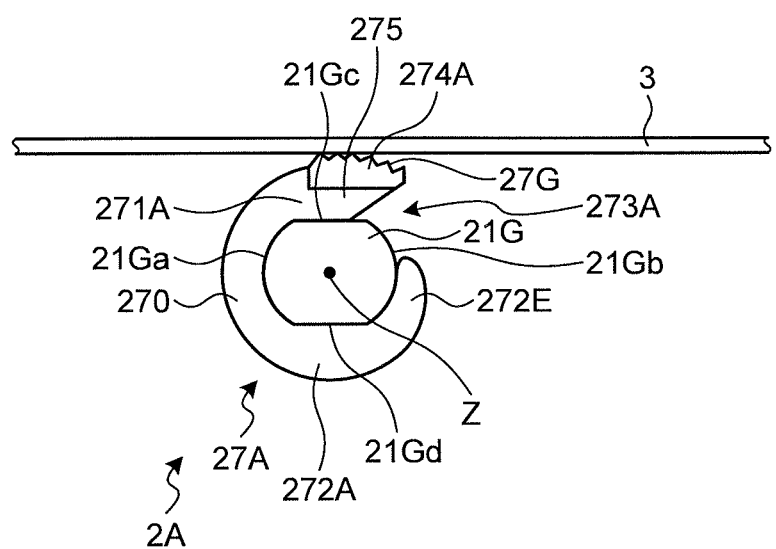
FIG. 11 is a diagram illustrating a state where a second fixing mechanism according to a first modified example is fixed.

FIG. 11 is a diagram illustrating a state where a second fixing mechanism according to a first modified example is fixed. A second fixing mechanism 2A according to the first modified example is a cam mechanism and includes a second rotation cam portion 21G of a tilt bolt 21 rotating along with an operation lever 6 and a lock member 27A. In addition, the same reference numerals will be given to the same components as the above-described embodiment and the repetitive description thereof will not be presented.

The lock member 27A is a cylindrical member into which the second rotation cam portion 21G is insertable. The lock member 27A includes, for example, a base portion 270, a first arm portion 271A, a second arm portion 272A, and an opening portion 273A. The first arm portion 271A is provided along a flat portion 21Gc from the end of the base portion 270 which is nearest to an inner column 3. The second arm portion 272A is provided along a flat portion 21Gd from the end of the base portion 270 opposite to the inner column 3. The opening portion 273A is a notch formed from one end to the other end in the axial direction of the tilt bolt 21 and is disposed at the rear side of the second rotation cam portion 21G.

The first arm portion 271A includes a contact portion 274A and an inner peripheral portion 275. The contact portion 274A is formed of, for example, metal such as steel and contacts the inner column 3. The inner peripheral portion 275 is formed of, for example, resin having an elastic modulus smaller than that of steel, is located near the second rotation cam portion 21G in relation to the contact portion 274A, and contacts the flat portion 21Gc. The contact portion 274A is fixed to the inner peripheral portion 275. Further, the base portion 270, the inner peripheral portion 275, and the second arm portion 272A are formed of resin so as to be integrated with one another, and form a holding portion contacting the second rotation cam portion 21G. The second arm portion 272A includes a protrusion portion 272E which is provided along a rear circular-arc portion 21Gb from the rear end. Accordingly, the width of the opening portion 273A in the circumferential direction of the second rotation cam portion 21G is smaller than the width of the opening portion 273 of the above-described embodiment.

In the first modified example, when the inner column 3 moves forward in the event of a secondary collision, a forward force is applied to the lock member 27A. When the lock member 27A moves forward, the protrusion portion 272E is deformed downward in the tilt direction by the reaction force applied from the rear circular-arc portion 21Gb. Then, the lock member 27A is deformed until the width of the opening portion 273A in the circumferential direction of the second rotation cam portion 21G is equal to the length in the width direction of the second rotation cam portion 21G. Accordingly, since the lock member 27A is movable forward, the lock member can be separated from the second rotation cam portion 21G by the forward force applied from the inner column 3.

In the first modified example, a force applied to the lock member 27A, at a state where the lock member 27A is deformed such that the width of the opening portion 273A in the circumferential direction of the second rotation cam portion 21G becomes equal to the length of the second rotation cam portion 21G in the width direction, is a separation load of the lock member 27A. The separation load depends on the elastic modulus of the base portion 270, the inner peripheral portion 275, and the second arm portion 272A.

In addition, the contact portion 274A may be formed of metal such as aluminum alloy, a sintered material, resin, or engineering plastics. Further, the base portion 270, the inner peripheral portion 275, and the second arm portion 272A may be formed of a material other than resin. However, it is desirable to form the base portion 270, the inner peripheral portion 275, and the second arm portion 272A by a material having an elastic modulus smaller than the material used in the contact portion 274A.

As described above, in the first modified example, the first arm portion 271A includes the metallic contact portion 274A and the holding portion. The holding portion is provided nearer to the second rotation cam portion 21G than to the contact portion 274A so as to contact the second rotation cam portion 21G. The holding portion which is formed by the base portion 270, the inner peripheral portion 275, and the second arm portion 272A is formed of a material having an elastic modulus smaller than the contact portion 274A. Accordingly, since the contact portion 274A is formed of metal, the friction force generated between the inner column 3 and the lock member 27A is easily stabilized. Meanwhile, since the holding portion which is formed by the base portion 270, the inner peripheral portion 275, and the second arm portion 272A is formed of resin having an elastic modulus smaller than metal, the deformation amount of the lock member 27A can be easily adjusted. Thus, the steering device 100 according to the first modified example can suppress a variation of the separation load of the lock member 27A and easily set the separation load.

Second Modified Example

Figure 12:
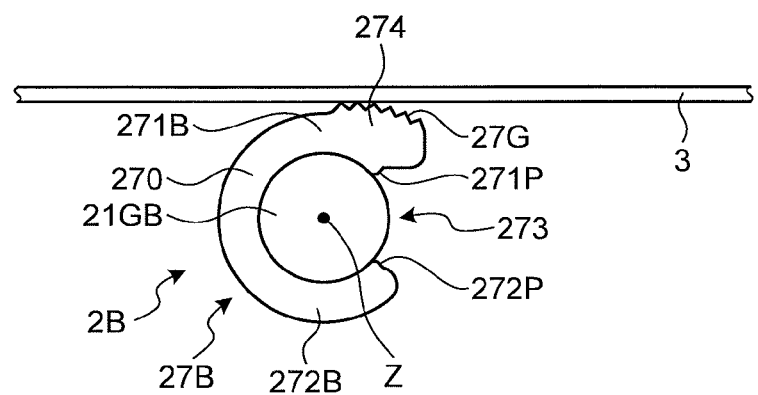
FIG. 12 is a diagram illustrating a state where a second fixing mechanism according to a second modified example is fixed.

FIG. 12 is a diagram illustrating a state where a second fixing mechanism according to a second modified example is fixed. A second fixing mechanism 2B according to the second modified example is a cam mechanism and includes a second rotation cam portion 21 GB of a tilt bolt 21 rotating along with an operation lever 6 and a lock member 27B. In addition, the same reference numerals will be given to the same components as the above-described embodiment and the repetitive description thereof will not be presented.

As illustrated in FIG. 12, the second rotation cam portion 21 GB is a member of which the cross-section orthogonal to the rotation shaft Z is circular. The diameter of the second rotation cam portion 21 GB is equal to the diameter of the bolt body 21B illustrated in FIG. 7. In the second modified example, the second rotation cam portion 21 GB is a part of the bolt body 21B and indicates the center portion of the bolt body 21B in the axial direction. In addition, the diameter of the second rotation cam portion may be different from the diameter of the bolt body 21B.

The lock member 27B is a cylindrical member to which the second rotation cam portion 21 GB is penetrable. The lock member 27B includes, for example, a base portion 270, a first arm portion 271B, a second arm portion 272B, and an opening portion 273. The first arm portion 271B is provided along the surface of the second rotation cam portion 21 GB from the end of the base portion 270 at a side of the inner column 3. The second arm portion 272B is provided along the surface of the second rotation cam portion 21 GB from the end of the base portion 270 opposite to the inner column 3. The opening portion 273 is a notch formed from one end to the other end in the axial direction of the tilt bolt 21 and is disposed at the rear side of the second rotation cam portion 21 GB. The first arm portion 271B and the second arm portion 272B protrude backward in relation to the rotation shaft Z and face each other with the opening portion 273 interposed therebetween. The first arm portion 271B includes a protrusion portion 271P and the second arm portion 272B includes a protrusion portion 272P.

In the second modified example, when the inner column 3 moves forward in the event of a secondary collision, a forward force is applied to the lock member 27B. When the lock member 27B moves forward, the lock member 27B is deformed so as to widen the width of the opening portion 273 in the circumferential direction of the second rotation cam portion 21 GB. Subsequently, the lock member 27B is deformed until the distance from the protrusion portion 271P to the protrusion portion 272P is equal to the diameter of the second rotation cam portion 21 GB. Accordingly, since the lock member 27B is movable forward, the lock member can be separated from the second rotation cam portion 21 GB by the forward force applied from the inner column 3.

In the second modified example, a force applied to the lock member 27B, at a state where the lock member 27B is deformed such that the distance from the protrusion portion 271P to the protrusion portion 272P becomes equal to the diameter of the second rotation cam portion 21 GB, is a separation load of the lock member 27B. The separation load depends on the entire elastic modulus of the lock member 27B and the sizes of the protrusion portions 271P and 272P. Further, in the second modified example, the protrusion portions 271P and 272P may not be provided. In this case, the separation load depends on the entire elastic modulus of the lock member 27B.

In the second modified example, the cross-sectional shape of the second rotation cam portion 21 GB orthogonal to the rotation shaft Z is circular, and is the same as the cross-sectional shape of the bolt body 21B. For this reason, since there is no need to provide a step of forming the second rotation cam portion 21 GB, the tilt bolt 21 can be more easily manufactured compared with the above-described embodiment.

Third Modified Example

Figure 13:
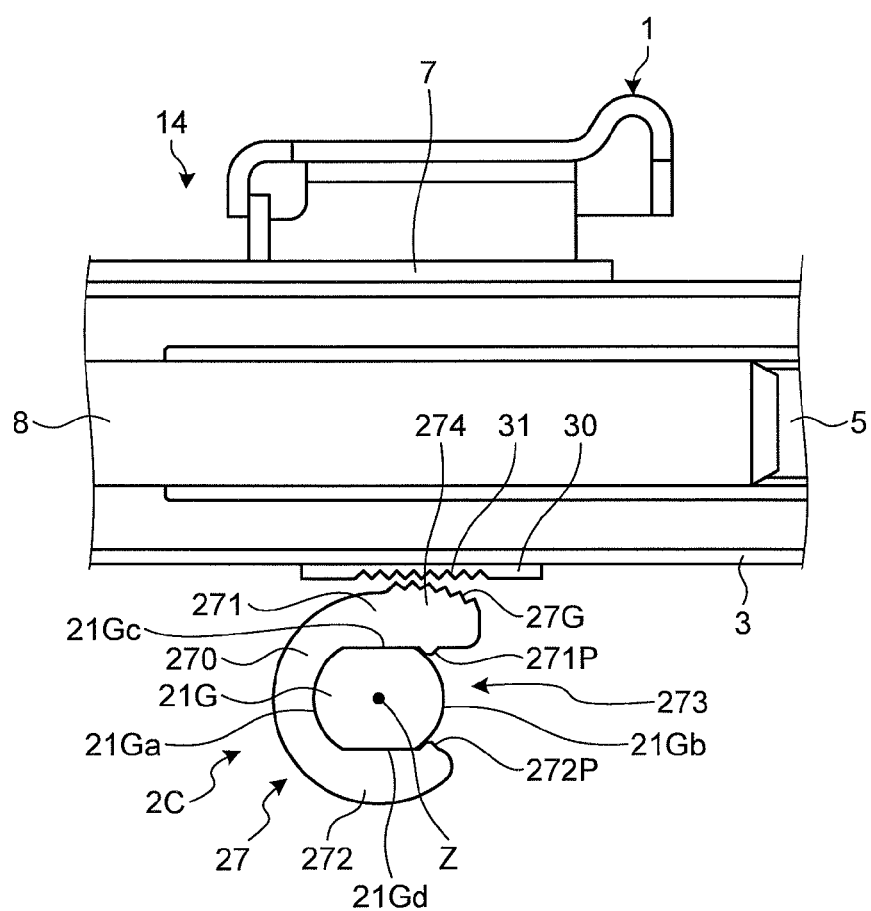
FIG. 13 is a diagram illustrating a state where a second fixing mechanism according to a third modified example is fixed.
Figure 14:
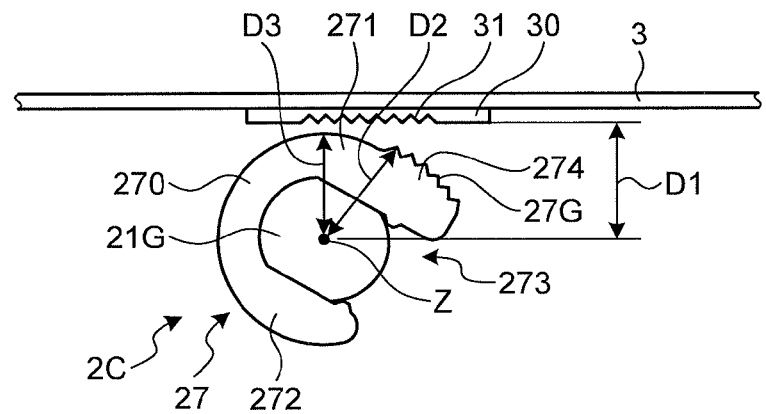
FIG. 14 is a diagram illustrating a state where the fixing of the second fixing mechanism according to the third modified example is released.
Figure 15:
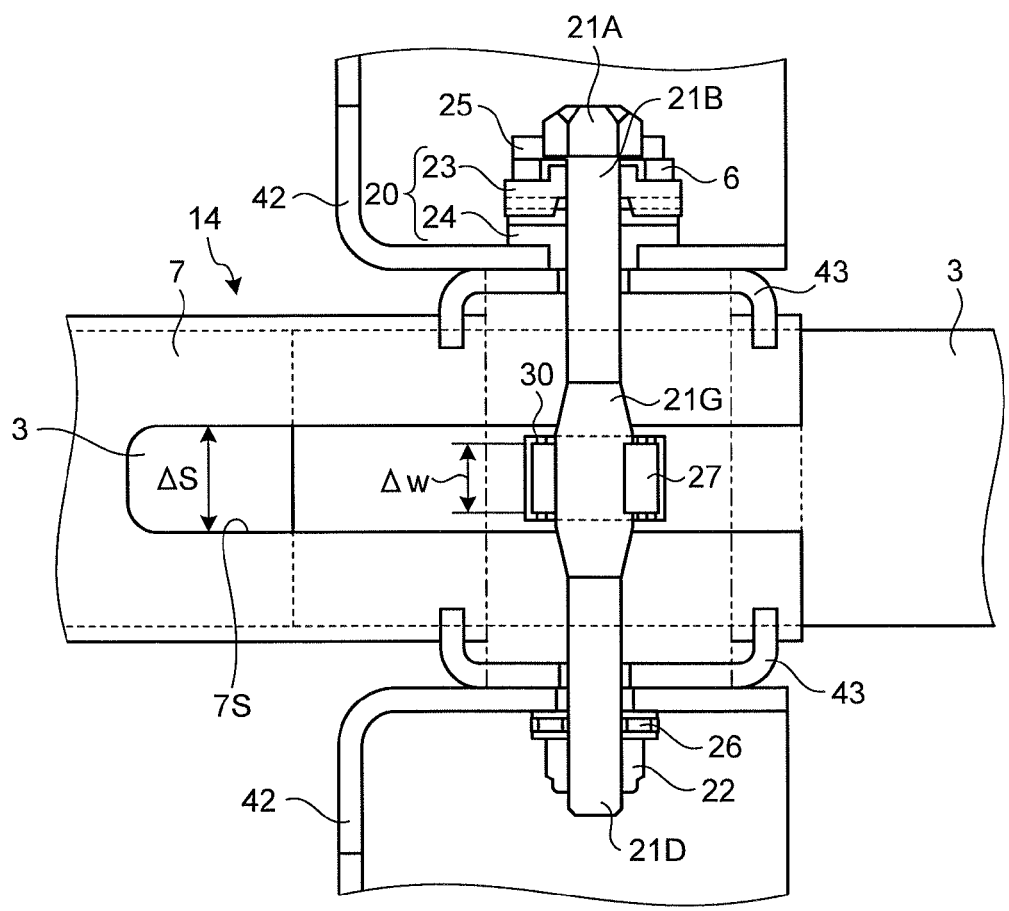
FIG. 15 is a top view illustrating the second fixing mechanism according to the third modified example when viewed from the downside in the tilt direction.

FIG. 13 is a diagram illustrating a state where a second fixing mechanism according to a third modified example is fixed. FIG. 14 is a diagram illustrating a state where the fixing of the second fixing mechanism according to the third modified example is released. FIG. 15 is a top view illustrating the second fixing mechanism according to the third modified example when viewed from the downside in the tilt direction. In addition, the same reference numerals will be given to the same components as the above-described embodiment and the repetitive description thereof will not be presented.

A second fixing mechanism 2C according to a third modified example is a cam mechanism and includes a second rotation cam portion 21G of a tilt bolt 21 rotating along with an operation lever 6, a lock member 27, and a gear lock rail 30 fixed to an inner column 3. The gear lock rail 30 has an elongated rail shape having a width of approximate $\Delta w$, which is smaller than the width $\Delta S$ of the slit 7S of the outer column 7, in the axial direction of the inner column 3 along the slit 7S. The gear lock rail 30 is fixed to the outer surface of the inner column 3. That is, the width of the gear lock rail 30 in the axial direction of the tilt bolt 21 is smaller than the width $\Delta S$ of the slit 7S and is substantially equal to the width $\Delta w$ of the lock member 27. The gear lock rail 30 is a rectangular member that has a long side in the longitudinal direction of the slit 7S when viewed from the downside in the tilt direction. The surface of the gear lock rail 30 is provided with a tooth portion 31 engaging with the tooth portion 27G of the lock member 27. The length of the gear lock rail 30 in the axial direction of the inner column 3 is a linear length in which the gear lock rail can sufficiently contact the lock member 27 within the rotation stroke of the second rotation cam portion 21G.

As illustrated in FIG. 13, in the second rotation cam portion 21G according to the third modified example, a flat portion 21Gc is a flat outer peripheral surface which is provided from a front circular-arc portion 21Ga toward a rear circular-arc portion 21Gb at the side of the gear lock rail 30 in relation to the rotation shaft Z. The flat portion 21Gd is an outer peripheral surface which is parallel to the flat portion 21Gc provided from the front circular-arc portion 21Ga toward the rear circular-arc portion 21Gb at the opposite side to the gear lock rail 30 in relation to the rotation shaft Z.

In the lock member 27 according to the third modified example, the first arm portion 271 is provided along the flat portion 21Gc from the end of the base portion 270 at a side of the gear lock rail 30. The second arm portion 272 is provided along the flat portion 21Gd from the end of the base portion 270 opposite to the gear lock rail 30. In addition, the lock member 27 and the gear lock rail 30 may be formed of metal such as aluminum alloy, a sintered material, resin, or engineering plastics.

Further, the first arm portion 271 includes a contact portion 274 which is able to contact the gear lock rail 30 in response to the rotation of the operation lever 6. The contact portion 274 is provided to face the gear lock rail 30 in relation to an opening portion 273. The surface of the contact portion 274 is provided with the tooth portion 27G. As illustrated in FIG. 14, the first distance D1, which is the minimum distance from the rotation shaft Z to the outer surface of the gear lock rail 30 in a state where the fixing of the second fixing mechanism 2C is released, is smaller than the second distance D2, which is the distance from the rotation shaft Z to the surface of the contact portion 274 (the front end of the tooth portion 27G). Further, the first distance D1 is larger than the third distance D3, which is the maximum distance from the rotation shaft Z to the surface other than the contact portion 274 of the lock member 27. In the embodiment, the cross-sectional shape orthogonal to the rotation shaft Z of the portion other than the contact portion 274 of the lock member 27 forms a circle centering the rotation shaft Z. That is, the third distance D3 is constant.

When the second rotation cam portion 21G rotates with the rotation of the operation lever 6, the position of the contact portion 274 in the tilt direction changes. When the second rotation cam portion 21G rotates in a direction in which the contact portion 274 moves close to the inner column 3 (in the counter-clockwise direction of FIGS. 13 and 14), the tooth portion 27G engages with the tooth portion 31 of the gear lock rail 30 fixed to the inner column 3. Accordingly, the lock member 27 is urged to the inner column 3 in the tilt direction. For this reason, since the outer peripheral surface of the inner column 3 is pressed upward in the tilt direction in the inner peripheral surface of the outer column 7, a friction force generated between the inner column 3 and the outer column 7 increases.

When the second rotation cam portion 21G rotates in a direction in which the contact portion 274 moves away from the gear lock rail 30 fixed to the inner column 3 (a clockwise direction in FIGS. 13 and 14), the lock member 27 moves away from the outer peripheral surface of the inner column 3 so that the pressing force applied from the lock member 27 to the inner column 3 is released as illustrated in FIG. 14.

As illustrated in FIG. 15, the lock member 27 is attached to the second rotation cam portion 21G so as to face the outer surface of the gear lock rail 30 fixed to the inner column 3 exposed from the slit 7S of the outer column 7. The width of the gear lock rail 30 and the width Δw of the lock member 27 in the axial direction of the tilt bolt 21 are smaller than the width ΔS of the slit 7S. Accordingly, the lock member 27 does not disturb a clamping force generated between the pressing brackets 42.

Figure 16:
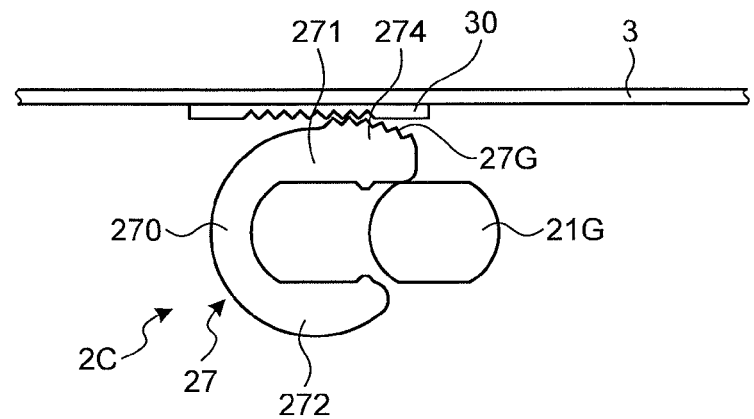
FIG. 16 is a diagram illustrating a state of the second fixing mechanism according to the third modified example in the event of a secondary collision.

FIG. 16 is a diagram illustrating a state of the second fixing mechanism according to the third modified example in the event of a secondary collision. In a state where the first fixing mechanism 20 clamps the outer column 7 and the second fixing mechanism 2C urges the lock member 27 to the inner column 3 in the tilt direction, a gear engagement friction force is generated between the tooth portion 27G and the gear lock rail 30 fixed to the inner column 3. Accordingly, when the inner column 3 moves forward in the event of a secondary collision, a forward force is applied to the lock member 27. As illustrated in FIG. 16, since the lock member 27 is movable forward, the lock member can be separated from the second rotation cam portion 21G by the forward force applied from the inner column 3.

As described above, the second fixing mechanism 2C according to the third modified example includes the gear lock rail 30 fixed to the inner column 3. The lock member 27 is a cylindrical member to which the tilt bolt 21 is penetrable. The lock member 27 includes the opening portion 273 which is a notch formed from one end to the other end in the direction of the rotation shaft Z and is provided at the rear side of the tilt bolt 21, and the contact portion 274 which is provided at the side of the inner column 3 in relation to the opening portion 273 and is able to contact the gear lock rail 30 fixed to the inner column 3. Accordingly, since the lock member has a cylindrical shape in a normal use state, it is possible to suppress the concern that the lock member 27 falls off from the second rotation cam portion 21G. Further, since the opening portion 273 is provided, the lock member 27 can move forward by the friction force transmitted through the contact portion 274 in the event of a secondary collision, and hence the lock member 27 can be separated from the second rotation cam portion 21G. Thus, the steering device 100 can suppress the concern that the lock member 27 falls off in a normal use state and can separate the lock member 27 in the event of a secondary collision.

The first distance D1, which is the minimum distance from the rotation shaft Z of the tilt bolt 21 to the outer peripheral surface of the gear lock rail 30 fixed to the inner column 3 in a state where the fixing of the second fixing mechanism 2C is released, is smaller than the second distance D2, which is the distance from the rotation shaft Z to the surface of the contact portion 274, and is larger than the third distance D3, which is the maximum distance from the rotation shaft Z to the surface other than the contact portion 274 of the lock member 27. Accordingly, the contact portion 274 is able to contact the gear lock rail 30 fixed to the inner column 3 in response to the rotation of the operation lever 6, and the lock member 27 does not contact the gear lock rail 30 fixed to the inner column 3 when the operation lever 6 rotates in the reverse direction. For this reason, the steering device 100 can easily select the released state and the fixed state by the rotation of the operation lever 6.

The lock member 27 includes the tooth portion 27G provided in the surface of the contact portion 274. The gear lock rail 30 includes the tooth portion 31 which engages with the tooth portion 27G in the surface facing the lock member 27. Accordingly, the contact portion 274 engages with or meshes with the gear lock rail 30 fixed to the inner column 3, and hence any loss does not occur when a force is transmitted therebetween. Thus, the steering device 100 can suppress a variation of the separation load of the lock member 27.

Fourth Modified Example

Figure 17:
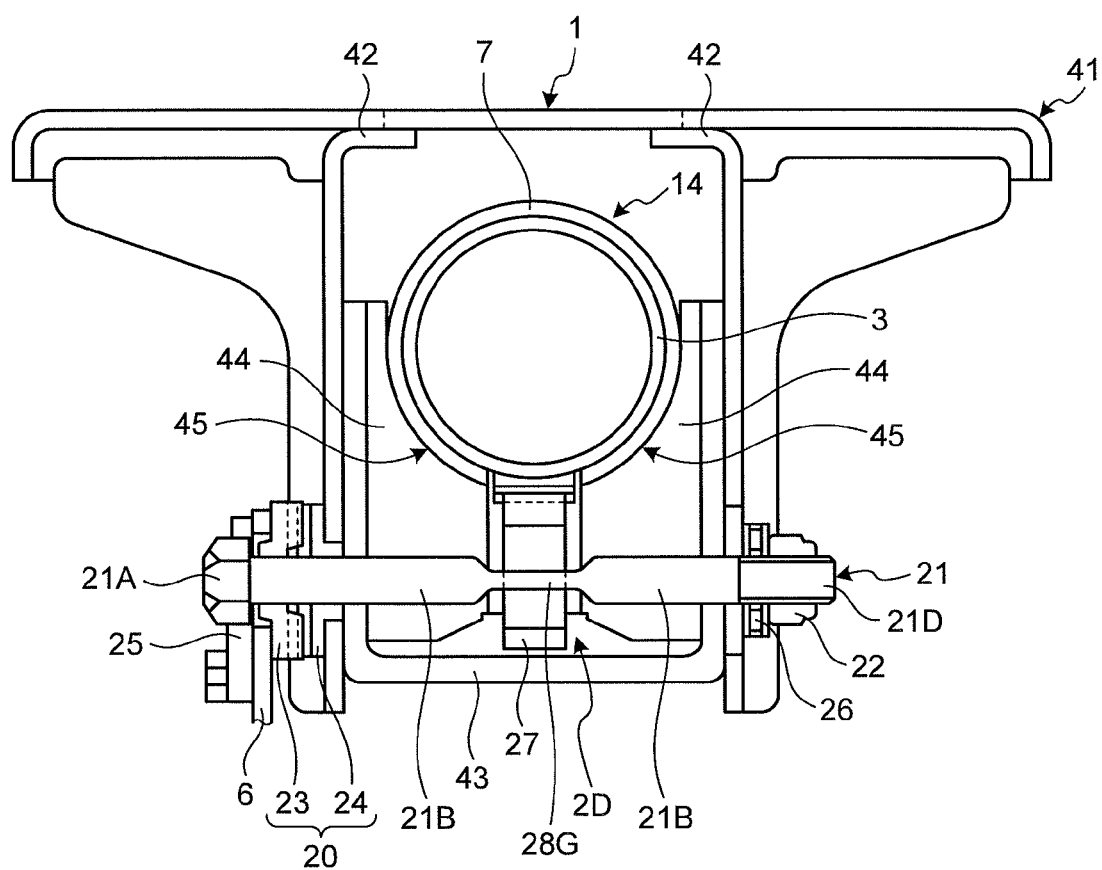
FIG. 17 is a cross-sectional view taken along the line A-A of FIG. 2 in a steering device according to a fourth modified example.
Figure 18:
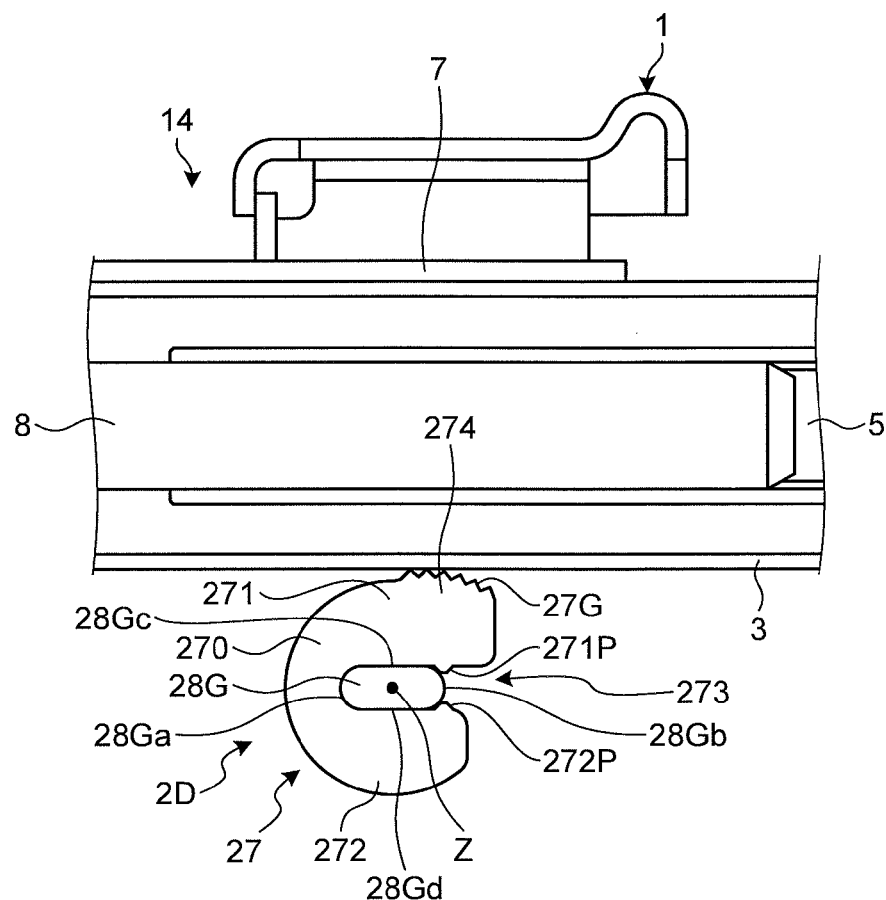
FIG. 18 is a diagram illustrating a state where the second fixing mechanism according to the fourth modified example is fixed.
Figure 19:
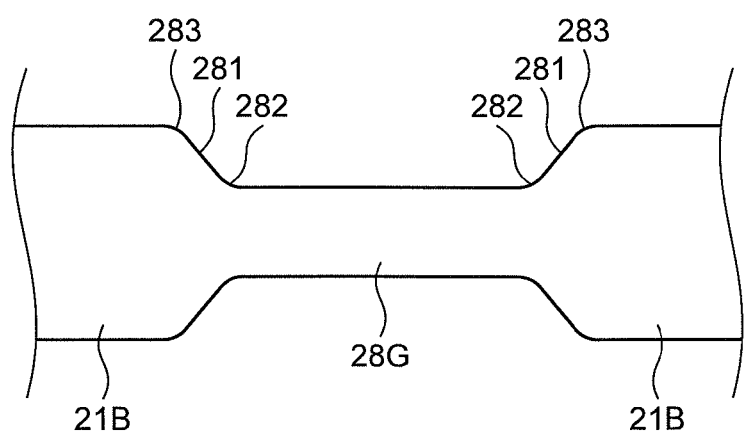
FIG. 19 is an enlarged view of a tilt bolt according to the fourth modified example.
Figure 20:
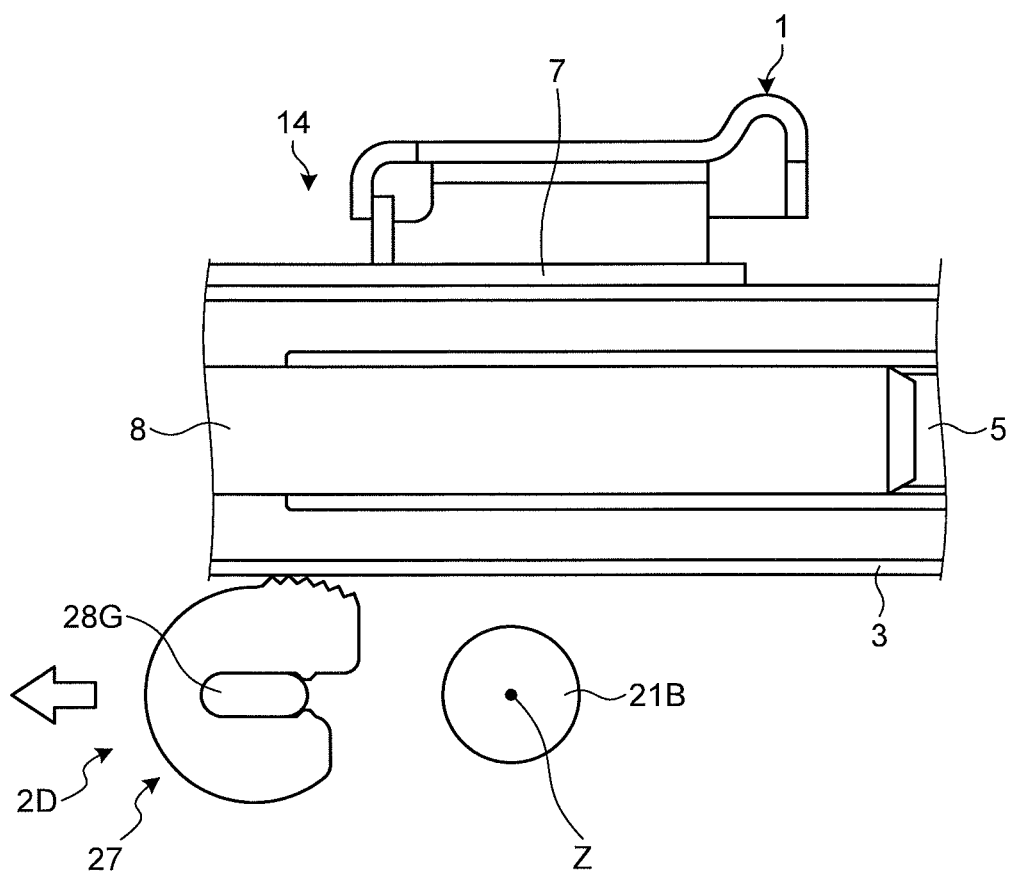
FIG. 20 is a diagram illustrating a state of the second fixing mechanism according to the fourth modified example in the event of a secondary collision.
Figure 21:
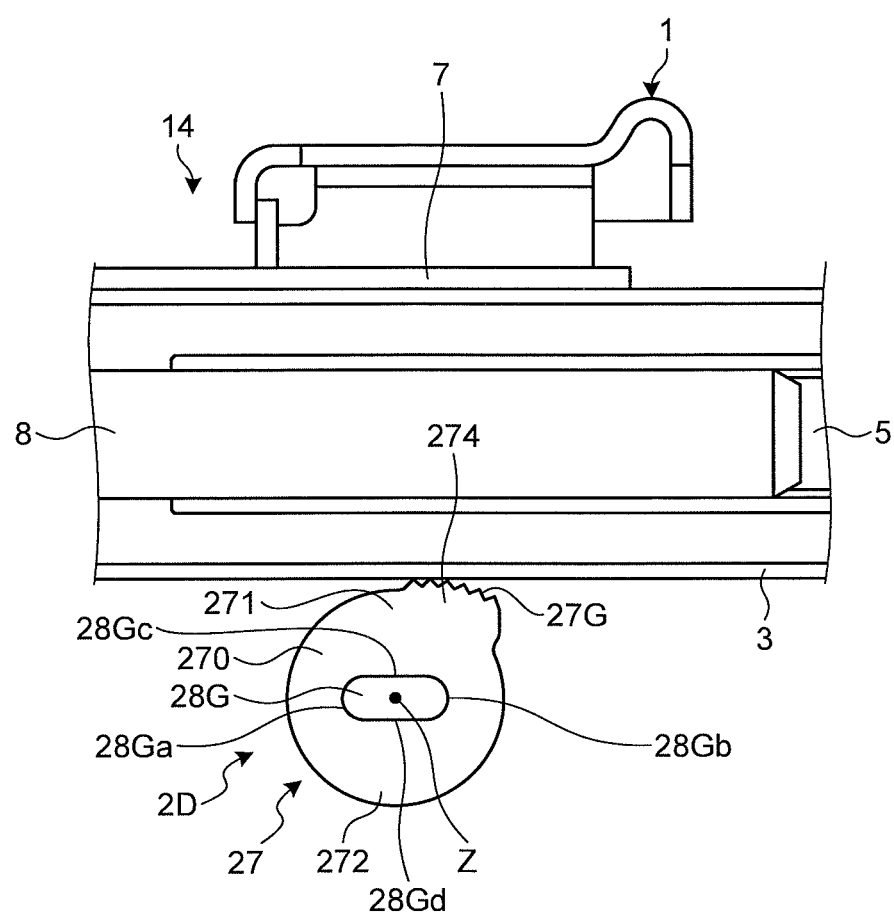
FIG. 21 is a diagram illustrating another structure of a lock member according to the fourth modified example.

FIG. 17 is a cross-sectional view taken along the line A-A of FIG. 2 in a steering device according to a fourth modified example. FIG. 18 is a diagram illustrating a state where a second fixing mechanism according to the fourth modified example is fixed. FIG. 19 is an enlarged view illustrating a tilt bolt according to the fourth modified example. FIG. 20 is a diagram illustrating a state of the second fixing mechanism according to the fourth modified example in the event of a secondary collision. FIG. 21 is a diagram illustrating another structure of the lock member according to the fourth modified example. In addition, the same reference numerals will be given to the same components as the above-described embodiment and the repetitive description thereof will not be presented.

As illustrated in FIG. 17, a tilt bolt 21 according to the fourth modified example includes two bolt bodies 21B and a shearing portion 28G. Two bolt bodies 21B respectively penetrate the pressing brackets 42 at both sides of the outer column 7. The shearing portion 28G is disposed between two bolt bodies 21B. The shearing portion 28G is integrated with, for example, the bolt bodies 21B so as to connect two bolt bodies 21B. The outer periphery of the shearing portion 28G is smaller than the outer periphery of the bolt body 21B. The outer periphery indicates the outer circumference. That is, the cross-section of the shearing portion 28G in the plane orthogonal to the rotation shaft Z is smaller than the cross-section of the bolt body 21B in the plane orthogonal to the rotation shaft Z.

As illustrated in FIG. 18, the shearing portion 28G is a member of which the cross-sectional shape orthogonal to the rotation shaft Z of the tilt bolt 21 is oval. The shearing portion 28G includes a front circular-arc portion 28Ga, a rear circular-arc portion 28Gb, and flat portions 28Gc and 28Gd. The front circular-arc portion 28Ga is a circular-arc outer peripheral surface located at the front side of the rotation shaft Z. The rear circular-arc portion 28Gb is a circular-arc outer peripheral surface located at the rear side of the rotation shaft Z. The flat portion 28Gc is a flat outer peripheral surface which is provided from the front circular-arc portion 28Ga toward the rear circular-arc portion 28Gb at the side of the inner column 3 in relation to the rotation shaft Z. The flat portion 28Gd is an outer peripheral surface which is parallel to the flat portion 28Gc provided from the front circular-arc portion 28Ga toward the rear circular-arc portion 28Gb at the opposite side to the inner column 3 in relation to the rotation shaft Z. In addition, the cross-sectional shape of the shearing portion 28G orthogonal to the rotation shaft Z may not be essentially an oval shape, but may be a circular shape or a polygonal shape.

As illustrated in FIG. 19, the edge of the shearing portion 28G is chamfered. More specifically, the shearing portion 28G includes an inclined portion 281 which is provided at both ends of the tilt bolt 21 in the axial direction so that the outer periphery increases in size toward the bolt body 21B. Edges 282 and 283 corresponding to a difference between the outer periphery of the shearing portion 28G and the outer periphery of the bolt body 21B are provided at both ends of the inclined portion 281. As illustrated in FIG. 19, the edge 282 and the edge 283 are chamfered. That is, the edge 282 and the edge 283 are formed in a round shape instead of a sharp corner shape.

A second fixing mechanism 2D according to the fourth modified example is a cam mechanism and includes the shearing portion 28G of the tilt bolt 21 rotating with the operation lever 6 and a lock member 27.

In a state where the first fixing mechanism 20 clamps the outer column 7 and the second fixing mechanism 2D urges the lock member 27 to the inner column 3 in the tilt direction, a friction force is generated between the tooth portion 27G and the inner column 3. Accordingly, when the inner column 3 moves forward in the event of a secondary collision, a forward force is applied to the lock member 27.

As described above, since the outer periphery of the shearing portion 28G is smaller than the outer periphery of the bolt body 21B, the shear strength of the shearing portion 28G is smaller than that of the bolt body 21B. That is, the shearing portion 28G is easily shear-fractured. For this reason, in the fourth modified example, the possibility that causes the shear-fracture of the shearing portion 28G when a forward force is applied to the lock member 27 is high compared with the above-described embodiments. When a forward force is applied to the lock member 27, the shearing portion 28G may be shear-fractured or the lock member 27 may be separated from the shearing portion 28G depending on the rigidity (deformability) of the lock member 27 and the shear strength of the shearing portion 28G.

For example, in the fourth modified example, the shear strength of the shearing portion 28G is set so that a force necessary to shear-fracture the shearing portion 28G becomes smaller than a force necessary to cause the protrusion portion 271P and the protrusion portion 272P to respectively ride on the flat portion 28Gc and the flat portion 28Gd. Accordingly, the shearing portion 28G is shear-fractured in response to a forward force applied to the lock member 27. When the shearing portion 28G is shear-fractured, the lock member 27 can be separated from the tilt bolt 21 (the bolt body 21B) along with the shearing portion 28G as illustrated in FIG. 20. In this case, a force applied to the lock member 27 when the shearing portion 28G is shear-fractured is the separation load of the lock member 27. For this reason, the separation load depends on the shear strength of the shearing portion 28G.

When the shearing portion 28G is shear-fractured, the opening portion 273 does not give a large influence on the separation of the lock member 27, but is useful in the operation of attaching the lock member 27 to the tilt bolt 21. That is, since the lock member 27 is attached to the tilt bolt 21 through the opening portion 273, the lock member 27 can be easily attached.

When the shear strength of the shearing portion 28G is set so that a force necessary to shear-fracture the shearing portion 28G becomes larger than a force necessary to cause the protrusion portion 271P and the protrusion portion 272P to respectively ride on the flat portion 28Gc and the flat portion 28Gd, the shearing portion 28G is not shear-fractured. That is, the lock member 27 is separated from the shearing portion 28G in response to the forward force applied to the lock member 27. For this reason, since the lock member 27 is movable forward, the lock member can be separated from the tilt bolt 21 (the shearing portion 28G) by the forward force applied from the inner column 3. In this case, similarly to the above-described embodiment, a force applied to the lock member 27 when the protrusion portion 271P rides on the flat portion 21Gc or the protrusion portion 272P rides on the flat portion 21Gd is the separation load of the lock member 27. For this reason, the separation load depends on the entire elastic modulus of the lock member 27 and the sizes of the protrusion portions 271P and 272P.

Further, a tensile force is applied to the shearing portion 28G when the first fixing mechanism 20 clamps the outer column 7. For this reason, it is desirable to set the shape of the shearing portion 28G in consideration of the tensile strength as well as the shear strength. In the fourth modified example, although the shearing portion 28G is easily shear-fractured, the edge 282 and the edge 283 are chamfered. Accordingly, even when a tensile force is applied to the shearing portion 28G, a crack is not easily generated from the edge 282 and the edge 283 as starting points. For this reason, the shear strength of the shearing portion 28G is stabilized.

In addition, the lock member 27 according to the fourth modified example may not essentially include the opening portion 273 as illustrated in FIG. 18. For example, as illustrated in FIG. 21, the lock member 27 may be an annular member without the opening portion 273. Even in this case, the lock member 27 can be separated from the tilt bolt 21 (the bolt body 21B) along with the shearing portion 28G.

In addition, the shearing portion 28G may not be essentially integrated with the bolt body 21B. For example, the shearing portion 28G may be formed of resin differently from the bolt body 21B. Further, the edge 282 and the edge 283 may not be essentially chamfered. For example, at least one of the edge 282 and the edge 283 may be chamfered and both the edge 282 and the edge 283 may not be chamfered.

As described above, in the steering device 100 according to the fourth modified example, when the inner column 3 moves toward the front side of the vehicle body in a state where the first fixing mechanism 20 clamps the outer column 7 and the second fixing mechanism 2D urges the lock member 27 to the inner column 3 in the tilt direction, the lock member 27 is separated from the tilt bolt 21 (the bolt body 21B) along with a part (the shearing portion 28G) of the tilt bolt 21. Accordingly, the separation load of the lock member 27 depends on the shear strength of the shearing portion 28G. The shear strength of the shearing portion 28G is easily set compared with the setting of the rigidity of the lock member 27. For this reason, the separation load of the lock member 27 is easily set.

Further, the tilt bolt 21 includes two bolt bodies 21B, which respectively penetrate the pressing brackets 42 at both sides of the outer column 7, and the shearing portion 28G which is disposed between two bolt bodies 21B and has an outer periphery smaller than the outer periphery of the bolt body 21B. The lock member 27 is attached to the shearing portion 28G. Accordingly, the shearing portion 28G is shear-fractured in response to the forward force applied to the lock member 27. For this reason, the separation load of the lock member 27 depends on the shear strength of the shearing portion 28G. The shear strength of the shearing portion 28G is easily set compared with the setting of the rigidity of the lock member 27. Further, the shearing force applied to the shearing portion 28G is easily equally set at both sides of the lock member 27. Thus, the separation load of the lock member 27 is easily set.

Further, the edge 282 and the edge 283 of the shearing portion 28G are chamfered. Accordingly, even when a tensile force is applied to the shearing portion 28G, a crack is not easily generated from the edge 282 and the edge 283 as starting points. For this reason, since the shear strength of the shearing portion 28G is stabilized, the separation load of the lock member 27 is stabilized.

Fifth Modified Example

Figure 22:
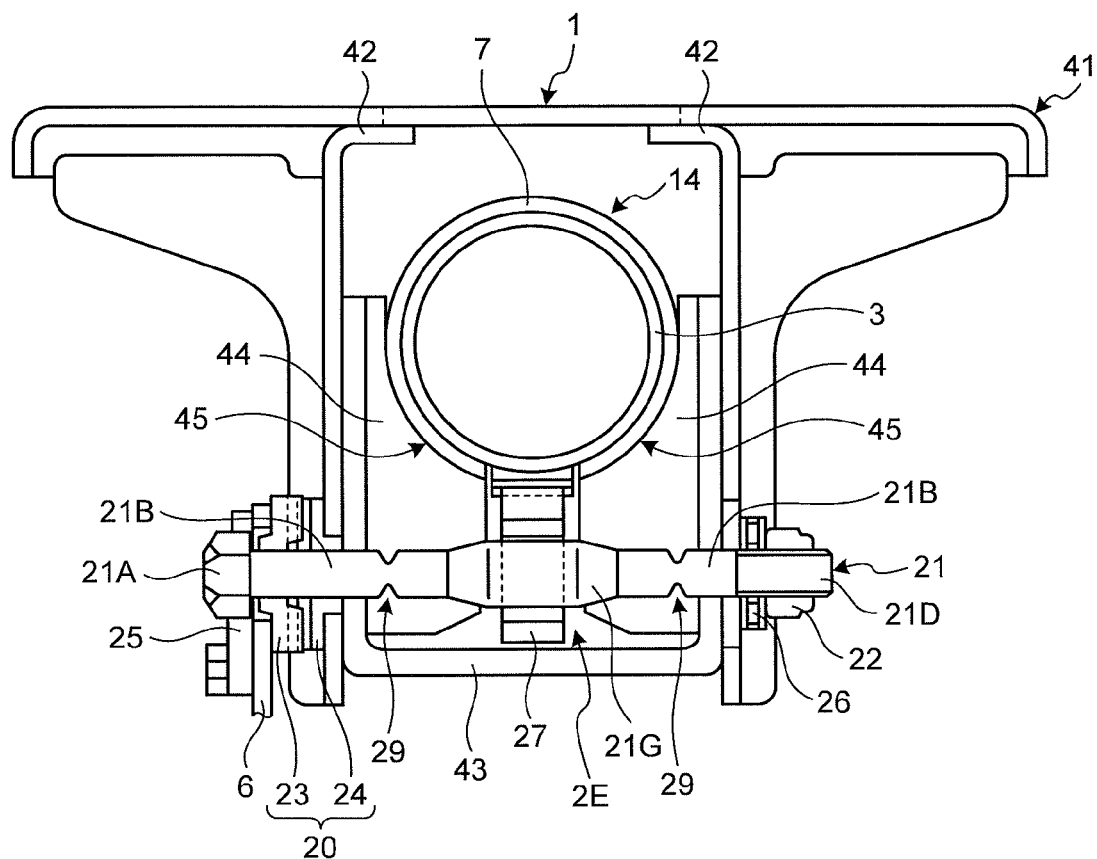
FIG. 22 is a cross-sectional view taken along the line A-A of FIG. 2 in a steering device according to a fifth modified example.
Figure 23:
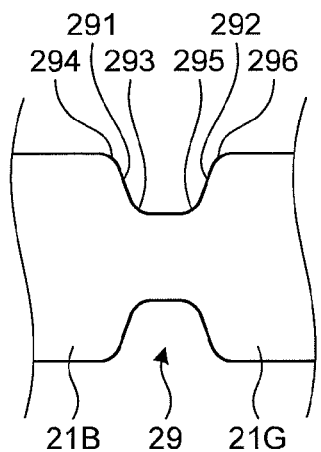
FIG. 23 is an enlarged view of a tilt bolt according to the fifth modified example.

FIG. 22 is a cross-sectional view taken along the line A-A of FIG. 2 in a steering device according to a fifth modified example. FIG. 23 is an enlarged view of a tilt bolt according to the fifth modified example. In addition, the same reference numerals will be given to the same components as the above-described embodiment and the repetitive description thereof will not be presented.

As illustrated in FIG. 22, a tilt bolt 21 according to the fifth modified example includes two bolt bodies 21B, a second rotation cam portion 21G, and a shearing portion 29. Two bolt bodies 21B respectively penetrate pressing brackets 42 at both sides of the outer column 7. The second rotation cam portion 21G is disposed between two bolt bodies 21B. For example, two shearing portions 29 are provided at both ends of the second rotation cam portion 21G. Two shearing portions 29 are respectively disposed between the second rotation cam portion 21G and respective one of the bolt bodies 21B. The shearing portions 29 are integrated with, for example, the bolt bodies 21B and the second rotation cam portion 21G so as to connect the bolt bodies 21B and the second rotation cam portion 21G to each other. The outer periphery of the shearing portion 29 is smaller than the outer periphery of the bolt body 21B and the outer periphery of the second rotation cam portion 21G. That is, the cross-section of the shearing portion 29 in a plane orthogonal to the rotation shaft Z is smaller than the cross-section of the bolt body 21B in a plane orthogonal to the rotation shaft Z. In other words, the shearing portion 29 is a groove provided at both ends of the second rotation cam portion 21G.

As illustrated in FIG. 23, the edge of the shearing portion 29 is chamfered. More specifically, the shearing portion 29 includes an inclined portion 291, which is provided at one end of the tilt bolt 21 in the axial direction so that the outer periphery increases in size toward the bolt body 21B, and an inclined portion 292, which is provided at the other end of the tilt bolt 21 in the axial direction so that the outer periphery increases in size toward the second rotation cam portion 21G. Both ends of the inclined portion 291 are provided with edges 293 and 294 as step portions formed by the difference between the outer periphery of the shearing portion 29 and the outer periphery of the bolt body 21B. Both ends of the inclined portion 292 are provided with edges 295 and 296 as step portions formed by the difference between the outer periphery of the shearing portion 29 and the outer periphery of the second rotation cam portion 21G. As illustrated in FIG. 23, the edge 293, the edge 294, the edge 295, and the edge 296 are chamfered. That is, the edge 293, the edge 294, the edge 295, and the edge 296 are formed in a round shape instead of a sharp corner shape.

A second fixing mechanism 2E according to the fifth modified example is a cam mechanism and includes the second rotation cam portion 21G of the tilt bolt 21 rotating along with an operation lever 6 and a lock member 27.

In a state where the first fixing mechanism 20 clamps the outer column 7 and the second fixing mechanism 2E urges the lock member 27 to the inner column 3 in the tilt direction, a friction force is generated between the tooth portion 27G and the inner column 3. Accordingly, when the inner column 3 moves forward in the event of a secondary collision, a forward force is applied to the lock member 27.

As described above, since the outer periphery of the shearing portion 29 is smaller than the outer periphery of the bolt body 21B, the shear strength of the shearing portion 29 is smaller than that of the bolt body 21B. That is, the shearing portion 29 is easily shear-fractured. For this reason, in the fifth modified example, the possibility that causes the shear-fracture of the shearing portion 29 when a forward force is applied to the lock member 27 is high compared with the above-described embodiment. When a forward force is applied to the lock member 27, the shearing portion 29 may be shear-fractured or the lock member 27 may be separated from the second rotation cam portion 21G depending on the rigidity (deformability) of the lock member 27 and the shear strength of the shearing portion 29.

For example, in the fifth modified example, the shear strength of the shearing portion 29 is set so that a force necessary to shear-fracture the shearing portion 29 becomes smaller than a force necessary to cause a protrusion portion 271P and a protrusion portion 272P to respectively ride on a flat portion 21Gc and a flat portion 21Gd (see FIG. 5). Accordingly, the shearing portion 29 is shear-fractured in response to a forward force applied to the lock member 27. When the shearing portion 29 is shear-fractured, the lock member 27 can be separated from the tilt bolt 21 (the bolt body 21B) along with the second rotation cam portion 21G. In this case, a force applied to the lock member 27 when the shearing portion 29 is shear-fractured is the separation load of the lock member 27. For this reason, the separation load depends on the shear strength of the shearing portion 29.

Further, a tensile force is applied to the shearing portion 29 when the first fixing mechanism 20 clamps the outer column 7. For this reason, it is desirable to set the shape of the shearing portion 29 in consideration of the tensile strength as well as the shear strength. In the fifth modified example, although the shearing portion 29 is easily shear-fractured, the edge 293, the edge 294, the edge 295, and the edge 296 are chamfered. Accordingly, even when a tensile force is applied to the shearing portion 29, a crack is not easily generated from the edge 293, the edge 294, the edge 295, and the edge 296 as starting points. For this reason, the shear strength of the shearing portion 29 is stabilized.

In addition, the lock member 27 according to the fifth modified example may not essentially include the opening portion 273 (see FIG. 5). For example, as described in the fourth modified example, the lock member 27 may be an annular member without the opening portion 273. Even in this case, since the shearing portions 29 are shear-fractured, the lock member 27 can be separated from the tilt bolt 21 (the bolt body 21B) along with the second rotation cam portion 21G.

In addition, the shearing portions 29 may not be essentially integrated with the bolt body 21B and the second rotation cam portion 21G. For example, the shearing portions 29 may be formed of resin differently from the bolt body 21B and the second rotation cam portion 21G. Further, the edge 293, the edge 294, the edge 295, and the edge 296 may not be essentially chamfered. For example, at least one of the edge 293, the edge 294, the edge 295, and the edge 296 may be chamfered, and all of the edge 293, the edge 294, the edge 295, and the edge 296 may not be chamfered.

As described above, in the steering device 100 according to the fifth modified example, the tilt bolt 21 includes two bolt bodies 21B which respectively penetrate the pressing brackets 42 at both sides of the outer column 7, and two shearing portions 29 which are disposed between two bolt bodies 21B and have outer peripheries smaller than that of the bolt bodies 21B. The lock member 27 is disposed between two shearing portions 29. Accordingly, the shearing portions 29 are shear-fractured in response to the forward force applied to the lock member 27. For this reason, the separation load of the lock member 27 depends on the shear strength of the shearing portion 29. The shear strength of the shearing portion 29 is easily set compared with the setting of the rigidity of the lock member 27. Further, the shearing force applied to the shearing portion 29 is easily maintained equally at both sides of the lock member 27. Thus, the separation load of the lock member 27 is easily set.

Further, the edge 293, the edge 294, the edge 295, and the edge 296 of the shearing portion 29 are chamfered. Accordingly, even when a tensile force is applied to the shearing portion 29, a crack is not easily generated from the edge 293, the edge 294, the edge 295, and the edge 296 as starting points. For this reason, since the shear strength of the shearing portion 29 is stabilized, the separation load of the lock member 27 is stabilized.

The steering device according to the above-described embodiment can be also applied to a steering device including an electric motor.

REFERENCE SIGNS LIST

1 COLUMN BRACKET
2, 2A, 2B, 2C, 2D, 2E SECOND FIXING MECHANISM
3 INNER COLUMN
4 STEERING WHEEL
5 INPUT SHAFT
6 OPERATION LEVER
7 OUTER COLUMN
7S SLIT
8 OUTPUT SHAFT
9 UNIVERSAL JOINT
10 LOWER SHAFT
11 UNIVERSAL JOINT
12 PIVOT BRACKET
13 VEHICLE BODY SIDE MEMBER
14 STEERING COLUMN
15 STEERING SHAFT
20 FIRST FIXING MECHANISM
21 TILT BOLT
21A TILT BOLT HEAD PORTION
21B BOLT BODY
21D SCREW PORTION
21G, 21 GB SECOND ROTATION CAM PORTION
21Ga FRONT CIRCULAR-ARC PORTION
21Gb REAR CIRCULAR-ARC PORTION
21Gc, 21Gd FLAT PORTION
22 CAULKING NUT
23 FIRST ROTATION CAM PORTION
24 FIRST FIXED CAM PORTION
25 SPIN STOPPER
26 THRUST BEARING
27, 27A, 27B LOCK MEMBER
270 BASE PORTION
271, 271A, 271B FIRST ARM PORTION
271P PROTRUSION PORTION
272, 272A, 272B SECOND ARM PORTION
272E PROTRUSION PORTION
272P PROTRUSION PORTION
273, 273A OPENING PORTION
274, 274A CONTACT PORTION
275 INNER PERIPHERAL PORTION
27G TOOTH PORTION
28G SHEARING PORTION
28Ga FRONT CIRCULAR-ARC PORTION
28Gb REAR CIRCULAR-ARC PORTION
28Gc, 28Gd FLAT PORTION
281 INCLINED PORTION
282, 283 EDGE
29 SHEARING PORTION
291, 292 INCLINED PORTION
293, 294, 295, 296 EDGE
30 GEAR LOCK RAIL
31 TOOTH PORTION
42 PRESSING BRACKET
43 DISTANCE BRACKET
44 POSITIONING PORTION
45 FIXED POSITION
100 STEERING DEVICE
RP RACK AND PINION
PV ROTATION SHAFT
SE POWER TRANSMISSION MECHANISM
VB VEHICLE BODY
Z ROTATION SHAFT

The invention claimed is:
1. A steering device comprising:
an inner column having a cylindrical shape and rotatably supporting an input shaft connected to a steering wheel;
an outer column that is a cylindrical member into which at least a part of the inner column is inserted, the outer column having a slit formed by notching an end from which the inner column is inserted;
a column bracket fixed to a vehicle body side member and clamping the outer column by a pressing bracket squeezing the outer column;
a tilt bolt penetrating the pressing bracket, and interlocked with an operation lever;
a lock member attached to an outer periphery of the tilt bolt;
a first fixing mechanism clamping the outer column in response to the rotation of the operation lever; and
a second fixing mechanism urging the lock member to the inner column in the tilt direction in response to the rotation of the operation lever,
wherein the lock member separates from the tilt bolt when the inner column moves toward a front side of a vehicle body in a state where the first fixing mechanism clamps the outer column and the second fixing mechanism urges the lock member to the inner column in the tilt direction.

2. The steering device according to claim 1,
wherein the lock member is a cylindrical member into which the tilt bolt is penetrable, and the lock member includes an opening portion provided at the rear side of the vehicle body in relation to the tilt bolt, the opening portion is a notch formed from one end to the other end in the axial direction of the tilt bolt, and a contact portion provided at a side of the inner column in relation to the opening portion to contact the inner column.

3. The steering device according to claim 2,
wherein a first distance that is a minimum distance from a rotation shaft of the tilt bolt to an outer peripheral surface of the inner column in a state where the fixing of the second fixing mechanism is released, is smaller than a second distance that is a distance from the rotation shaft to a surface of the contact portion, and the first distance is larger than a third distance that is a maximum distance from the rotation shaft to a surface other than the contact portion of the lock member.

4. The steering device according to claim 2,
wherein the lock member includes a metallic contact portion and a holding portion provided at a side of the tilt bolt in relation to the contact portion to contact the tilt bolt, and
wherein the holding portion is formed of a material having an elastic modulus smaller than the contact portion.

5. The steering device according to claim 2,
wherein the lock member includes a tooth portion provided on a surface of the contact portion.

6. The steering device according to claim 1,
wherein the lock member is a cylindrical member into which the tilt bolt is penetrable, and the lock member includes an opening portion provided at a rear side of the vehicle body in relation to the tilt bolt, the opening portion is a notch formed from one end to the other end in the axial direction of the tilt bolt, a contact portion provided at a side of the inner column in relation to the opening portion to contact the inner column, and a gear lock rail fixed to the inner column.

7. The steering device according to claim 1,
wherein the second fixing mechanism includes a gear lock rail fixed to the inner column, and
wherein the lock member is a cylindrical member into which the tilt bolt is penetrable, and the lock member includes an opening portion which is a notch formed from one end to the other end in the axial direction of the tilt bolt and is provided at a rear side of the vehicle body in relation to the tilt bolt, and a contact portion provided at a side of the inner column in relation to the opening portion to contact the gear lock rail.

8. The steering device according to claim 6 or 7,
wherein a first distance that is a minimum distance from a rotation shaft of the tilt bolt to an outer peripheral surface of the gear lock rail fixed to the inner column in a state where fixing of the second fixing mechanism is released, is smaller than a second distance that is a distance from the rotation shaft to a surface of the contact portion, and the first distance is larger than a third distance that is a maximum distance from the rotation shaft to a surface other than the contact portion of the lock member.

9. The steering device according to claim 6,
wherein the lock member includes a metallic contact portion and a holding portion provided at a side of the tilt bolt in relation to the contact portion to contact the tilt bolt, and
wherein the holding portion is formed of a material having an elastic modulus smaller than the contact portion.

10. The steering device according to claim 6,
wherein the lock member and the gear lock rail engage with each other at the surfaces thereof, and the surface of the contact portion is provided with a tooth portion.

11. The steering device according to claim 1,
wherein the outer column is located at the front side of the vehicle body, includes a pivot bracket, and is provided so that the separated inner column is insertable thereinto.

12. The steering device according to claim 1,
wherein the lock member separates from the tilt bolt along with a part of the tilt bolt when the inner column moves toward the front side of the vehicle body in the state where the first fixing mechanism clamps the outer column and the second fixing mechanism urges the lock member to the inner column in the tilt direction.

13. The steering device according to claim 1,
wherein the tilt bolt includes two bolt bodies which respectively penetrate the pressing brackets at both sides of the outer column and a shearing portion which is disposed between two bolt bodies and has an outer periphery smaller than the outer peripheries of the bolt bodies, and
wherein the lock member is attached to the shearing portion.

14. The steering device according to claim 1,
wherein the tilt bolt includes two bolt bodies which respectively penetrate the pressing brackets at both sides of the outer column and two shearing portions which are disposed between two bolt bodies and have outer peripheries smaller than the outer peripheries of the bolt bodies, and
wherein the lock member is disposed between two shearing portions.

15. The steering device according to claim 13,
wherein an edge of the shearing portion is chamfered.

16. The steering device according to claim 7,
wherein a first distance that is a minimum distance from a rotation shaft of the tilt bolt to an outer peripheral surface of the gear lock rail fixed to the inner column in a state where fixing of the second fixing mechanism is released, is smaller than a second distance that is a distance from the rotation shaft to a surface of the contact portion, and the first distance is larger than a third distance that is a maximum distance from the rotation shaft to a surface other than the contact portion of the lock member.

17. The steering device according to claim 7,
wherein the lock member includes a metallic contact portion and a holding portion provided at a side of the tilt bolt in relation to the contact portion to contact the tilt bolt, and
wherein the holding portion is formed of a material having an elastic modulus smaller than the contact portion.

18. The steering device according to claim 7,
wherein the lock member and the gear lock rail engage with each other at the surfaces thereof, and the surface of the contact portion is provided with a tooth portion.

19. The steering device according to claim 14,
wherein an edge of the shearing portion is chamfered.

* * * * *